US012103304B2

(12) United States Patent
Mori et al.

(10) Patent No.: US 12,103,304 B2
(45) Date of Patent: Oct. 1, 2024

(54) LIQUID DISCHARGE HEAD AND LIQUID DISCHARGE DEVICE

(71) Applicant: SEIKO EPSON CORPORATION, Tokyo (JP)

(72) Inventors: Masaki Mori, Shiojiri (JP); Yu Shiozawa, Shiojiri (JP); Hitoshi Takaai, Azumino (JP); Motoki Takabe, Shiojiri (JP); Eiju Hirai, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 121 days.

(21) Appl. No.: 18/059,885

(22) Filed: Nov. 29, 2022

(65) Prior Publication Data

US 2023/0166498 A1 Jun. 1, 2023

(30) Foreign Application Priority Data

Nov. 30, 2021 (JP) ................................ 2021-193702

(51) Int. Cl.
*B41J 2/045* (2006.01)

(52) U.S. Cl.
CPC ....... *B41J 2/04563* (2013.01); *B41J 2/04581* (2013.01)

(58) Field of Classification Search
CPC ................ B41J 2/04563; B41J 2/04581; B41J 2002/14362; B41J 2002/14419; B41J 2002/14459; B41J 2002/14491; B41J 2202/03; B41J 2202/11; B41J 2202/18; B41J 2/14233; B41J 2/14201; B41J 2/01
See application file for complete search history.

(56) References Cited

U.S. PATENT DOCUMENTS

2013/0016152 A1* 1/2013 Nonoyama .......... B41J 2/14233 347/17

FOREIGN PATENT DOCUMENTS

JP 2011-104916 A 6/2011

* cited by examiner

*Primary Examiner* — Lisa Solomon
(74) *Attorney, Agent, or Firm* — WORKMAN NYDEGGER

(57) ABSTRACT

A liquid discharge head includes a pressure chamber substrate that is provided with a plurality of pressure chambers, a piezoelectric body that is driven to apply pressure to liquid in the pressure chambers, an upper electrode that is provided above the piezoelectric body for applying a voltage to the piezoelectric body, a lower electrode that is provided below the piezoelectric body for applying a voltage to the piezoelectric body, a detection resistor that is provided below the piezoelectric body for detecting temperature of the liquid in the pressure chambers, and a first wiring portion that is electrically coupled to the detection resistor. The first wiring portion includes a first part that is extended above the piezoelectric body, and a second part that is provided in at least a part of a through hole penetrating the piezoelectric body and electrically coupled to the detection resistor.

13 Claims, 12 Drawing Sheets

LIQUID DISCHARGE HEAD AND LIQUID DISCHARGE DEVICE

The present application is based on, and claims priority from JP Application Serial Number 2021-193702, filed Nov. 30, 2021, the disclosure of which is hereby incorporated by reference herein in its entirety.

BACKGROUND

1. Technical Field

The present disclosure relates to a liquid discharge head and a liquid discharge device.

2. Related Art

A liquid discharge device having a temperature detection section on the side surface of a carriage on which a liquid discharge head is mounted is known (for example, JP-A-2011-104916). The liquid discharge device changes the number of maintenance drive pulses applied to a piezoelectric element based on an environmental temperature detected by the temperature detection section.

However, when the temperature detection section is provided outside the liquid discharge head, there is a possibility that temperature detection accuracy of the ink in a pressure chamber decreases. Therefore, there is a demand for disposing the temperature detection section in the vicinity of the pressure chamber in the liquid discharge head. Therefore, the inventors have newly found that the temperature of the ink in the pressure chamber is acquired by disposing resistance wiring inside the liquid discharge head and using the correspondence relationship between the resistance value of the resistance wiring and the temperature. However, it is desired to improve the temperature detection accuracy by the resistance wiring disposed inside the liquid discharge head.

SUMMARY

According to a first aspect of the present disclosure, there is provided a liquid discharge head. The liquid discharge head includes a pressure chamber substrate that is provided with a plurality of pressure chambers, a piezoelectric body that is driven to apply pressure to liquid in the pressure chambers, an upper electrode that is provided above the piezoelectric body for applying a voltage to the piezoelectric body, a lower electrode that is provided below the piezoelectric body for applying a voltage to the piezoelectric body, a detection resistor that is provided below the piezoelectric body for detecting temperature of the liquid in the pressure chambers, and a first wiring portion that is electrically coupled to the detection resistor. The first wiring portion includes a first part that is extended above the piezoelectric body, and a second part that is provided in at least a part of a through hole penetrating the piezoelectric body and electrically coupled to the detection resistor.

According to a second aspect of the present disclosure, there is provided a liquid discharge device. The liquid discharge device includes the liquid discharge head according to the first aspect, and a control section that controls a discharge operation of the liquid discharge head.

DESCRIPTION OF EXEMPLARY EMBODIMENTS

A. First Embodiment

Figure 1:
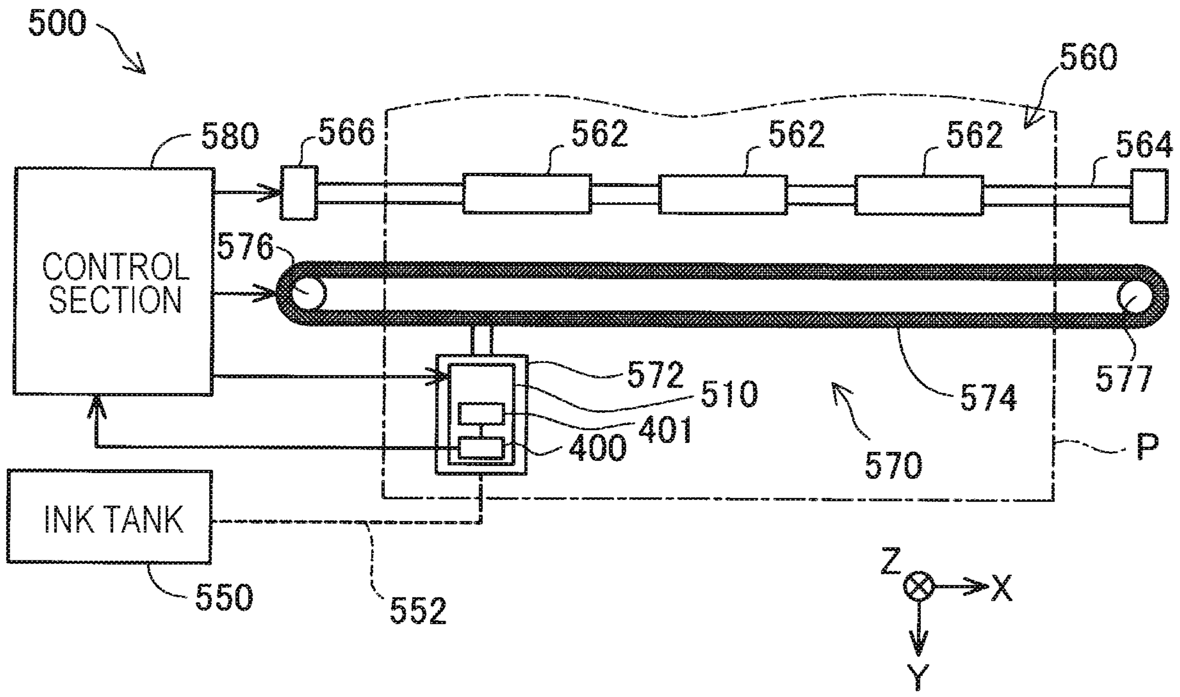
FIG. 1 is an explanatory view showing a schematic configuration of a liquid discharge device as a first embodiment of the present disclosure.

FIG. 1 is an explanatory view showing a schematic configuration of a liquid discharge device 500 as a first embodiment of the present disclosure. In the present embodiment, the liquid discharge device 500 is an ink jet printer that discharges ink as an example of a liquid onto printing paper P to form an image. The liquid discharge device 500 may use any kind of medium, such as a resin film or a cloth, as an ink discharge target, instead of the printing paper P. X, Y, and Z shown in FIG. 1 and each of the drawings subsequent to FIG. 1 represent three spatial axes orthogonal to each other. In the present specification, directions along the axes are also referred to as an X-axis direction, a Y-axis direction, and a Z-axis direction. When specifying the direction, a positive direction is "+" and a negative direction is "−" so that positive and negative signs are used together in the direction notation, and description will be performed while a direction to which an arrow faces in each of the drawings is the + direction and an opposite direction thereof is the − direction. In the present embodiment, the Z direction coincides with a vertical direction, the +Z direction indicates vertically downward, and the −Z direction indicates vertically upward. Further, when the positive direction and the negative direction are not limited, the three X, Y, and Z will be described as the X axis, the Y axis, and the Z axis.

As shown in FIG. 1, the liquid discharge device 500 includes a liquid discharge head 510, a temperature acquisition section 400, an ink tank 550, a transport mechanism 560, a moving mechanism 570, and a control section 580. The liquid discharge head 510 has a detection resistor 401. In the present embodiment, the temperature acquisition section 400 is included in the liquid discharge head 510. The liquid discharge head 510 is formed with a plurality of nozzles, discharges inks of a total of four colors, for example, black, cyan, magenta, and yellow in the +Z direction to form an image on a printing paper P. The liquid discharge head 510 is mounted on the carriage 572 and reciprocates in a main scanning direction with the movement of the carriage 572. In the present embodiment, the main scanning directions are the +X direction and the −X direction. The liquid discharge head 510 may further discharge ink of a random color such as light cyan, light magenta, or white, while not being limited to the four colors.

The ink tank 550 accommodates the ink to be discharged to the liquid discharge head 510. The ink tank 550 is coupled to the liquid discharge head 510 by a resin tube 552. The ink in the ink tank 550 is supplied to the liquid discharge head 510 via the tube 552. Instead of the ink tank 550, a bag-shaped liquid pack formed of a flexible film may be provided.

The transport mechanism 560 transports the printing paper P in a sub-scanning direction. The sub-scanning direction is a direction that intersects the X-axis direction, which is a main scanning direction, and is the +Y direction and the −Y direction in the present embodiment. The transport mechanism 560 includes a transport rod 564, on which three transport rollers 562 are mounted, and a transport motor 566 for rotatably driving the transport rod 564. When the transport motor 566 rotatably drives the transport rod 564, the printing paper P is transported in the +Y direction, which is the sub-scanning direction. The number of the transport rollers 562 is not limited to three and may be a random number. Further, a configuration, in which a plurality of transport mechanisms 560 are provided, may be provided.

The moving mechanism 570 includes a transport belt 574, a moving motor 576, and a pulley 577, in addition to the carriage 572. The carriage 572 mounts the liquid discharge head 510 in a state where the ink can be discharged. The carriage 572 is fixed to the transport belt 574. The transport belt 574 is bridged between the moving motor 576 and the pulley 577. When the moving motor 576 is rotatably driven, the transport belt 574 reciprocates in the main scanning direction. As a result, the carriage 572 fixed to the transport belt 574 also reciprocates in the main scanning direction.

The control section 580 controls the entire liquid discharge device 500. The control section 580 controls, for example, a reciprocating operation of the carriage 572 along the main scanning direction, a transport operation of the printing paper P along the sub-scanning direction, and a discharge operation of the liquid discharge head 510. The control section 580 includes, for example, one or a plurality of processing circuits such as a Central Processing Unit (CPU) or a Field Programmable Gate Array (FPGA), and one or a plurality of storage circuits such as a semiconductor memory.

Figure 2:
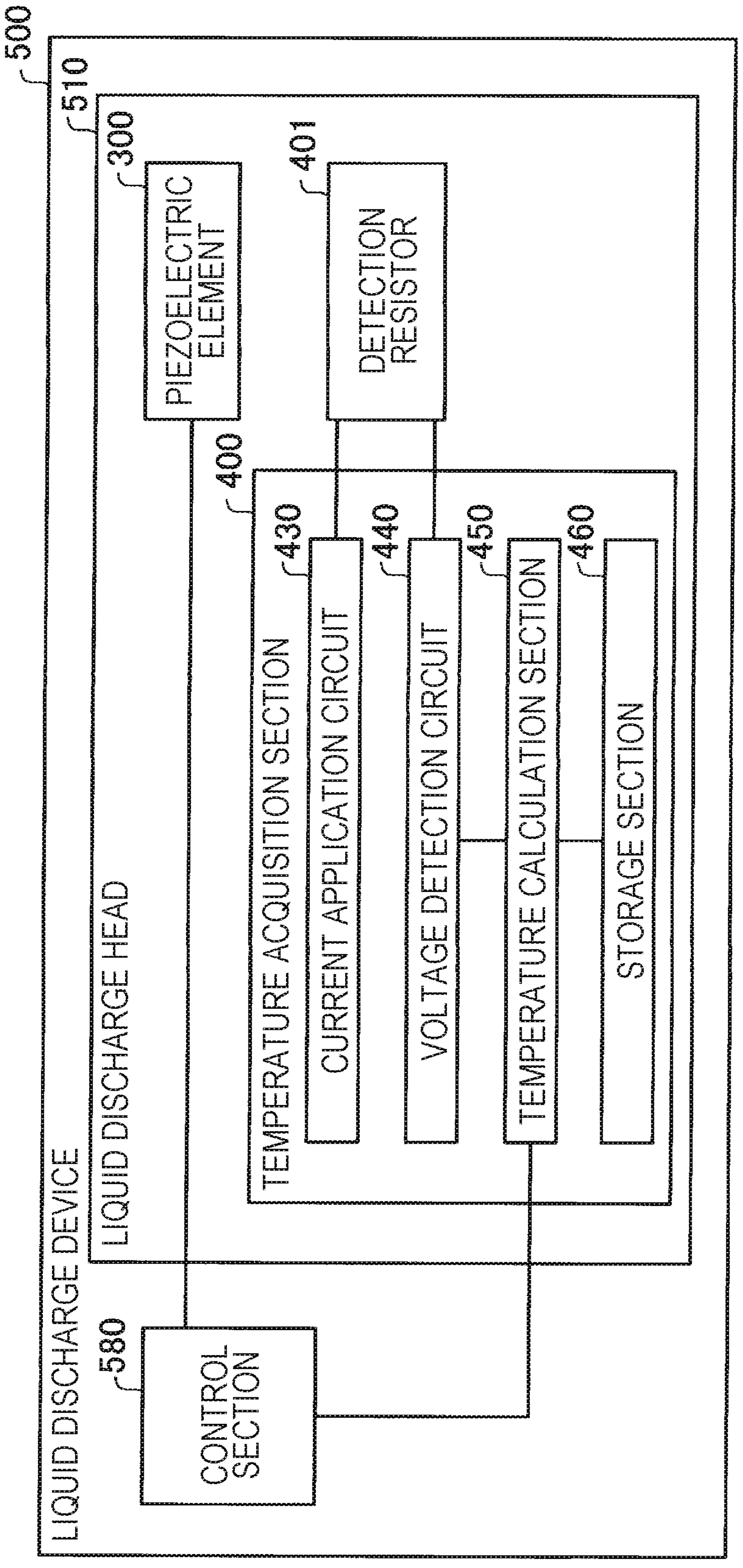
FIG. 2 is a block diagram showing a functional configuration of the liquid discharge device.

FIG. 2 is a block diagram showing a functional configuration of the liquid discharge device 500. In FIG. 2, the configurations of the ink tank 550, the transport mechanism 560, and the moving mechanism 570 are omitted. The liquid discharge head 510 of the present embodiment includes a piezoelectric element 300, a detection resistor 401, and a temperature acquisition section 400.

The piezoelectric element 300 causes a pressure change in the ink in the pressure chamber of the liquid discharge head 510. The detection resistor 401 is a resistance wiring used for detecting the temperature of the ink in the pressure chamber. The temperature acquisition section 400 estimates the temperature of the ink in the pressure chamber by detecting the temperature of the detection resistor 401 by utilizing the characteristic that the electric resistance value of the resistance wiring of metal, semiconductor, or the like changes depending on the temperature. The temperature acquisition section 400 includes a current application circuit 430, a voltage detection circuit 440, a temperature calculation section 450, and a storage section 460.

The current application circuit 430 applies a current to the detection resistor 401. In the present embodiment, the current application circuit 430 is a constant current circuit which causes a predetermined constant current to flow through the detection resistor 401. The voltage detection circuit 440 detects the voltage value of the voltage generated in the detection resistor 401 by applying the current.

As the storage section 460, for example, a non-volatile memory, such as EEPROM, which can be erased by an electric signal, a non-volatile memory, such as One-Time-PROM or EPROM, which can be erased by ultraviolet rays, and a non-volatile memory, such as PROM, which cannot be erased can be used. The storage section 460 stores various programs for realizing functions provided by the temperature acquisition section 400 in the present embodiment. The CPU of the temperature acquisition section 400 functions as the temperature calculation section 450 by executing various programs stored in the storage section 460.

The temperature calculation section 450 acquires the electric resistance value of the detection resistor 401 and calculates the temperature of the pressure chamber. Specifically, the temperature calculation section 450 acquires the resistance value of the detection resistor 401 based on the current value of the current applied to the detection resistor 401 from the current application circuit 430 and the voltage value of the voltage generated in the detection resistor 401 by applying the current. The temperature calculation section 450 calculates the temperature of the pressure chamber by using the acquired resistance value of the detection resistor 401 and a temperature calculation formula stored in the storage section 460. The temperature calculation formula shows the correspondence relationship between the electric resistance value of the detection resistor 401 and the temperature.

The temperature acquisition section 400 outputs the detected temperature of the pressure chamber to the control section 580. The control section 580 controls the discharge of the ink to the printing paper P by outputting a drive signal based on the temperature of the pressure chamber acquired from the temperature acquisition section 400 to the liquid discharge head 510 to drive the piezoelectric element 300.

Figure 3:
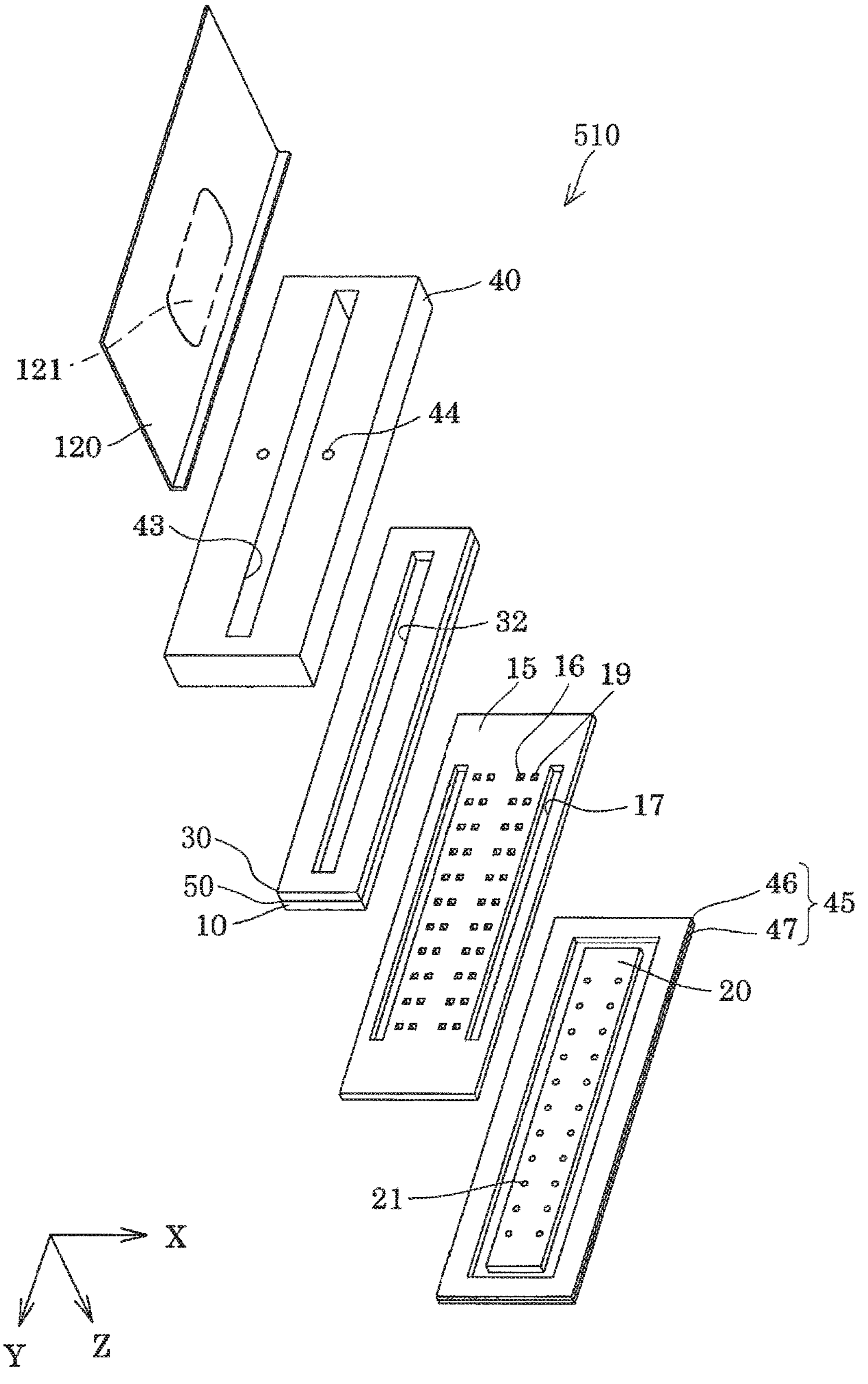
FIG. 3 is an exploded perspective view showing a configuration of a liquid discharge head.
Figure 4:
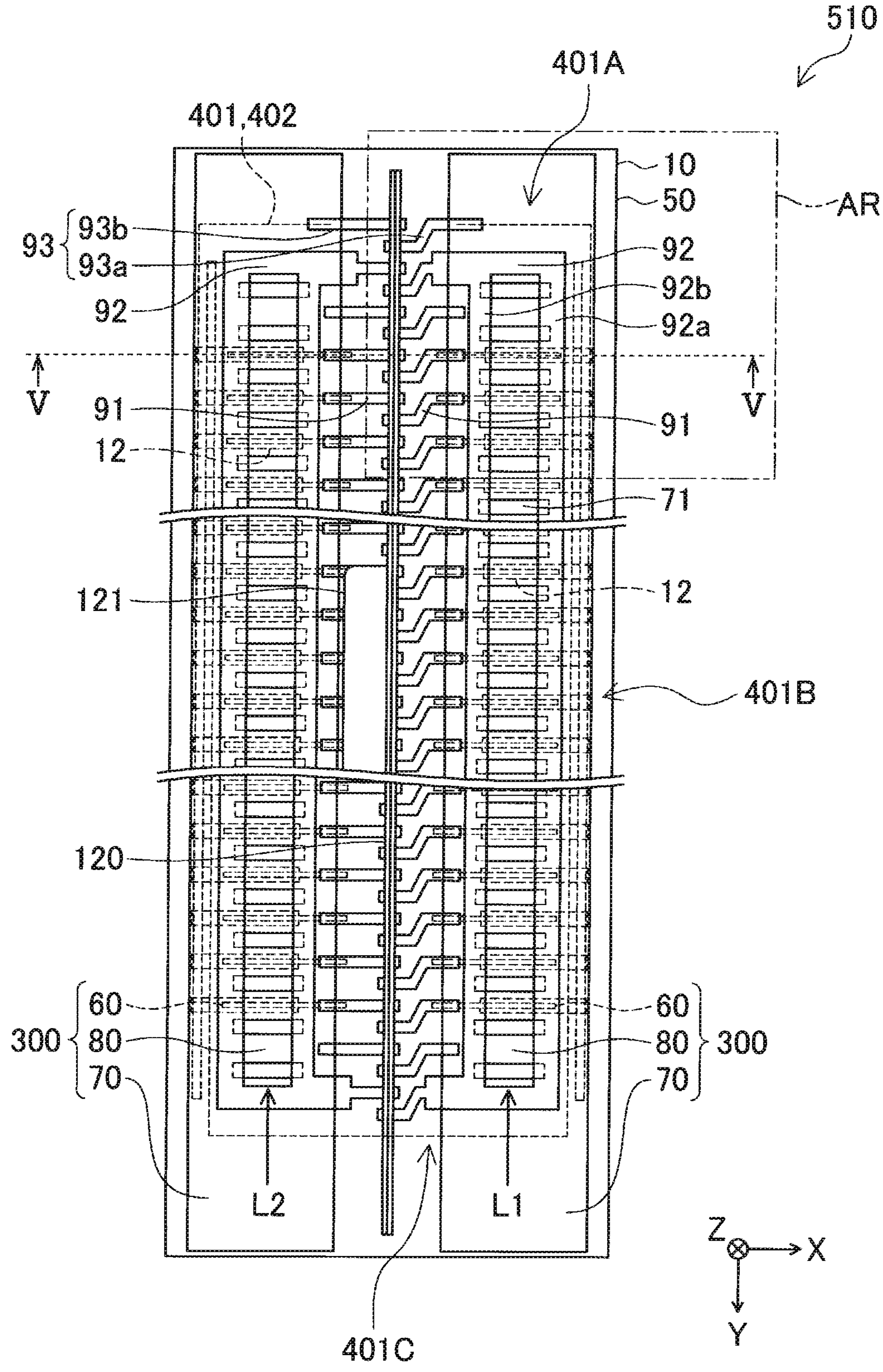
FIG. 4 is an explanatory view showing a configuration of the liquid discharge head in a plan view.
Figure 5:
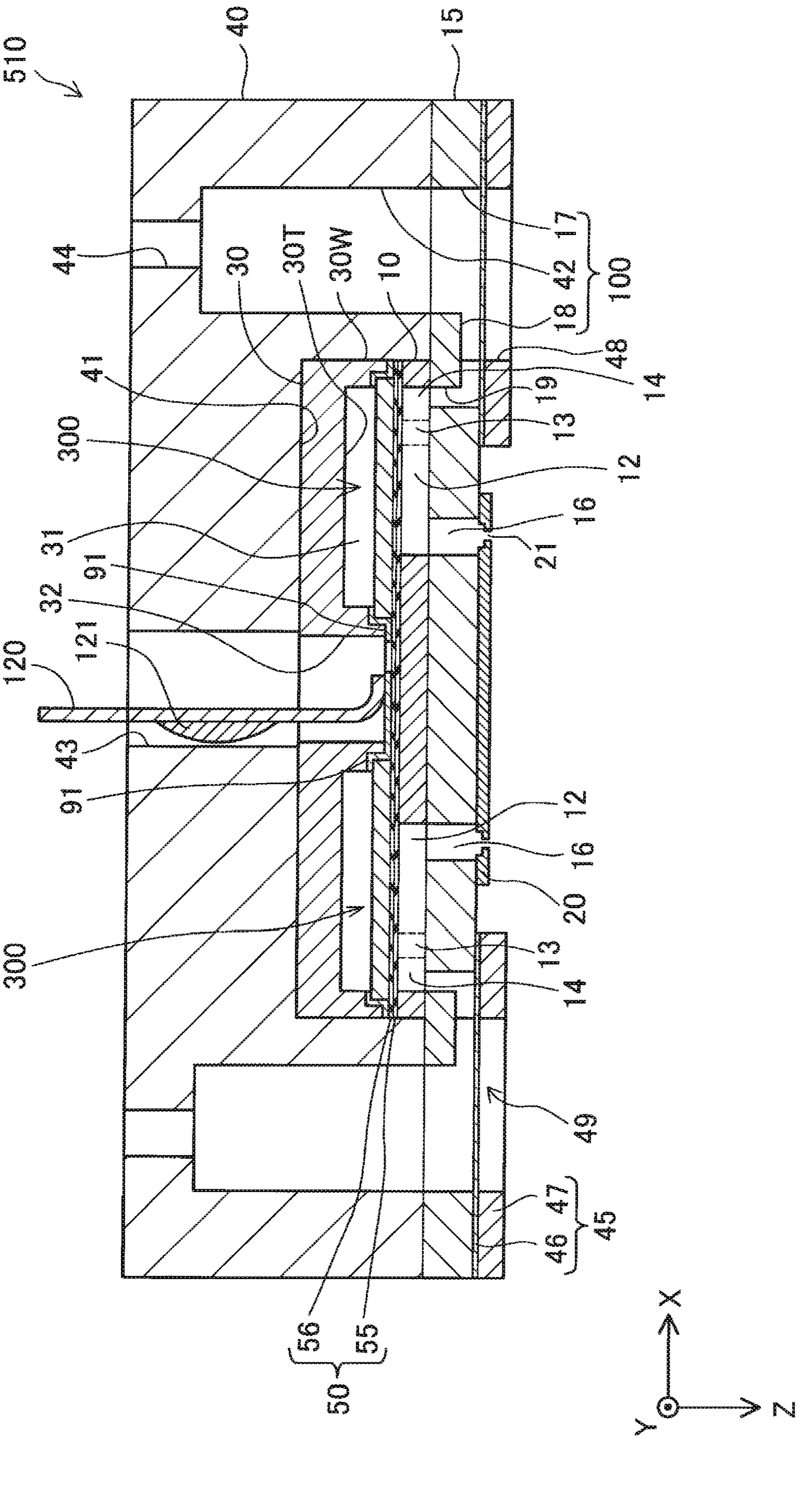
FIG. 5 is a cross-sectional view showing a V-V position of FIG. 4.

A detailed configuration of the liquid discharge head 510 will be described with reference to FIGS. 3 to 5. FIG. 3 is an exploded perspective view showing the configuration of the liquid discharge head 510. FIG. 4 is an explanatory view showing the configuration of the liquid discharge head 510 in a plan view. FIG. 4 shows a configuration in the vicinity of a pressure chamber substrate 10 in the liquid discharge head 510. In FIG. 4, a sealing substrate 30 and a case member 40 are not shown in the drawing for easy understanding of the technique. FIG. 5 is a cross-sectional view showing a V-V position of FIG. 4.

As shown in FIG. 3, the liquid discharge head 510 includes a pressure chamber substrate 10, a communication plate 15, a nozzle plate 20, a compliance substrate 45, a sealing substrate 30, a case member 40, a diaphragm 50, and a relay substrate 120, and further includes a piezoelectric element 300 shown in FIG. 4. The pressure chamber substrate 10, the communication plate 15, the nozzle plate 20, the compliance substrate 45, the diaphragm 50, the piezoelectric element 300, the sealing substrate 30, and the case member 40 are laminated members, and the liquid discharge head 510 is formed by laminating the laminated members. In the present disclosure, a direction in which the laminated members forming the liquid discharge head 510 are laminated is also referred to as a "lamination direction". In the present embodiment, the lamination direction coincides with the Z-axis direction.

The pressure chamber substrate 10 is formed by using, for example, a silicon substrate, a glass substrate, an SOI substrate, various ceramic substrates, and the like. As shown in FIG. 4, a plurality of pressure chambers 12 are arranged in the pressure chamber substrate 10 along a predetermined direction in the pressure chamber substrate 10. The direction in which the plurality of pressure chambers 12 are arranged is also referred to as an "arrangement direction". The pressure chamber 12 is formed in a substantially rectangular shape in which a length in the X-axis direction is longer than a length in the Y-axis direction in a plan view. In the present disclosure, the "plan view" means a state in which an object is viewed along the lamination direction. The shape of the pressure chamber 12 is not limited to the rectangular shape, and may be a parallelogram shape, a polygonal shape, a circular shape, an oval shape, or the like. The oval shape means a shape in which both end portions in a longitudinal direction are semicircular based on a rectangular shape, and includes a rounded rectangular shape, an elliptical shape, an egg shape, and the like.

In the present embodiment, the plurality of pressure chambers 12 are arranged in two rows each having the Y-axis direction as the arrangement direction. In the example of FIG. 4, the pressure chamber substrate 10 is formed with two pressure chamber rows, that is, a first pressure chamber row L1 having the Y-axis direction as the arrangement direction and a second pressure chamber row L2 having the Y-axis direction as the arrangement direction. The first pressure chamber row L1 and the second pressure chamber row L2 are disposed on both sides while sandwiching the relay substrate 120. Specifically, the second pressure chamber row L2 is disposed on the opposite side of the first pressure chamber row L1 sandwiching the relay substrate 120 in the direction that intersects the arrangement direction of the first pressure chamber row L1. The direction orthogonal to both the arrangement direction and the lamination direction is also referred to as an "intersection direction". In the example of FIG. 4, the intersection direction is the X-axis direction, and the second pressure chamber row L2 is disposed in the −X direction with respect to the first pressure chamber row L1 while sandwiching the relay substrate 120. The plurality of pressure chambers 12 do not necessarily have to be arranged in a straight line, and, for example, the plurality of pressure chambers 12 may be arranged along the Y-axis direction according to so-called staggered arrangement to be alternately disposed in the intersection direction.

The plurality of pressure chambers 12 belonging to the first pressure chamber row L1 and the plurality of pressure chambers 12 belonging to the second pressure chamber row L2 have positions which are respectively coincide with each other in the arrangement direction, and are disposed to be adjacent to each other in the intersection direction.

As shown in FIG. 3, the communication plate 15, the nozzle plate 20, and the compliance substrate 45 are laminated on the +Z direction side of the pressure chamber substrate 10. The communication plate 15 is, for example, a flat plate member using a silicon substrate, a glass substrate, an SOI substrate, various ceramic substrates, a metal substrate, or the like. Examples of the metal substrate include a stainless steel substrate or the like. As shown in FIG. 5, the communication plate 15 is provided with a nozzle communication path 16, a first manifold portion 17, a second manifold portion 18, and a supply communication path 19. It is preferable that the communication plate 15 is formed by using a material having a thermal expansion coefficient substantially the same as a thermal expansion coefficient of the pressure chamber substrate 10. As a result, when the temperatures of the pressure chamber substrate 10 and the communication plate 15 change, it is possible to suppress the warp of the pressure chamber substrate 10 and the communication plate 15 due to a difference in the thermal expansion coefficient.

As shown in FIG. 5, the nozzle communication path 16 is a flow path that communicates the pressure chamber 12 and a nozzle 21. The first manifold portion 17 and the second manifold portion 18 function as a part of a manifold 100 which is a common liquid chamber in which a plurality of pressure chambers 12 communicate with each other. The first manifold portion 17 is provided to penetrate the communication plate 15 in the Z-axis direction. Further, as shown in FIG. 5, the second manifold portion 18 is provided on a surface of the communication plate 15 on the +Z direction side without penetrating the communication plate 15 in the Z-axis direction.

As shown in FIG. 5, the supply communication path 19 is a flow path coupled to a pressure chamber supply path 14 provided on the pressure chamber substrate 10. The pressure chamber supply path 14 is a flow path coupled to one end portion of the pressure chamber 12 in the X-axis direction via a throttle portion 13. The throttle portion 13 is a flow path provided between the pressure chamber 12 and the pressure chamber supply path 14. The throttle portion 13 is a flow path in which an inner wall protrudes from the pressure chamber 12 and the pressure chamber supply path 14 and which is formed narrower than the pressure chamber 12 and the pressure chamber supply path 14. As a result, the throttle portion 13 is set so that the flow path resistance is higher than those of the pressure chamber 12 and the pressure chamber supply path 14. According to the liquid discharge head 510 configured in this way, even when pressure is applied to the pressure chamber 12 by the piezoelectric element 300 when the ink is discharged, it is possible to reduce or prevent the ink in the pressure chamber 12 from flowing back to the pressure chamber supply path 14. A plurality of supply communication paths 19 are arranged along the Y-axis direction, that is, the arrangement direction, and are individually provided for the respective pressure chambers 12. The supply communication path 19 and the pressure chamber supply path 14 communicates the second manifold portion 18 with each pressure chamber 12, and supplies the ink in the manifold 100 to each pressure chamber 12.

The nozzle plate 20 is provided on a side opposite to the pressure chamber substrate 10, that is, on a surface of the communication plate 15 on the +Z direction side while sandwiching the communication plate 15 therebetween. The material of the nozzle plate 20 is not particularly limited, and, for example, a silicon substrate, a glass substrate, an SOI substrate, various ceramic substrates, and a metal substrate can be used. Examples of the metal substrate include a stainless steel substrate or the like. As the material of the nozzle plate 20, an organic substance, such as a polyimide resin, can also be used. However, it is preferable that the nozzle plate 20 uses a material substantially the same as the thermal expansion coefficient of the communication plate 15. As a result, when the temperatures of the nozzle plate 20 and the communication plate 15 change, it is possible to suppress the warp of the nozzle plate 20 and the communication plate 15 due to the difference in the thermal expansion coefficient.

A plurality of nozzles 21 are formed on the nozzle plate 20. Each nozzle 21 communicates with each pressure chamber 12 via the nozzle communication path 16. As shown in FIG. 3, the plurality of nozzles 21 are arranged along the arrangement direction of the pressure chamber 12, that is, the Y-axis direction. The nozzle plate 20 is provided with two nozzle rows in which the plurality of nozzles 21 are arranged in a row. The two nozzle rows are provided to correspond to the first pressure chamber row L1 and the second pressure chamber row L2, respectively.

As shown in FIG. 5, the compliance substrate 45 is provided together with the nozzle plate 20 on the side opposite to the pressure chamber substrate 10 while sandwiching the communication plate 15 therebetween, that is, on a surface of the communication plate 15 on the +Z direction side. The compliance substrate 45 is provided around the nozzle plate 20 and covers openings of the first manifold portion 17 and the second manifold portion 18 provided in the communication plate 15. In the present embodiment, the compliance substrate 45 includes a sealing film 46 made of a flexible thin film and a fixed substrate 47 made of a hard material such as metal. As shown in FIG. 5, a region of the fixed substrate 47, which faces the manifold 100, is an opening portion 48 completely removed in a thickness direction. Therefore, one surface of the manifold 100 is a compliance portion 49 sealed only by the sealing film 46.

As shown in FIG. 5, the diaphragm 50 and the piezoelectric element 300 are laminated on a side opposite to the nozzle plate 20 or the like, that is, on a surface of the pressure chamber substrate 10 on the −Z direction side while sandwiching the pressure chamber substrate 10 therebetween. The piezoelectric element 300 bends and deforms the diaphragm 50 to cause a pressure change in the ink in the pressure chamber 12. In FIG. 5, a configuration of the piezoelectric element 300 is simplified and shown for easy understanding of the technique. The diaphragm 50 is provided on the +Z direction side of the piezoelectric element 300, and the pressure chamber substrate 10 is provided on the +Z direction side of the diaphragm 50.

As shown in FIG. 5, the sealing substrate 30 having substantially the same size as the pressure chamber substrate 10 in a plan view is further bonded to the surface of the pressure chamber substrate 10 on the −Z direction side by an adhesive or the like. The sealing substrate 30 includes a ceiling portion 30T, a wall portion 30W, a holding portion 31, and a through hole 32. The holding portion 31 is a concave space defined by the ceiling portion 30T and the wall portion 30W, and protects the active portion of the piezoelectric element 300. The holding portion 31 of the sealing substrate 30 is provided for each row of the piezoelectric elements 300 arranged along the arrangement direction, and, in the present embodiment, two holding portions 31 are formed to be arranged adjacent to each other in the X-axis direction. Further, the through hole 32 extends between the two holding portions 31 along the Y-axis direction and penetrates the sealing substrate 30 along the Z-axis direction.

As shown in FIG. 5, the case member 40 is fixed on the sealing substrate 30. The case member 40 forms the manifold 100 that communicates with the plurality of pressure chambers 12, together with the communication plate 15. The case member 40 has substantially the same outer shape as the communication plate 15 in a plan view, and is bonded to cover the sealing substrate 30 and the communication plate 15.

The case member 40 has an accommodation section 41, a supply port 44, a third manifold portion 42, and a coupling port 43. The accommodation section 41 is a space having a depth capable of accommodating the pressure chamber substrate 10 and the sealing substrate 30. The third manifold portion 42 is a space formed on both outer sides of the accommodation section 41 in the X-axis direction in the case member 40. The manifold 100 is formed by coupling the third manifold portion 42 to the first manifold portion 17 and the second manifold portion 18 provided in the communication plate 15. The manifold 100 has a long shape that is continuous over the Y-axis direction. The supply port 44 communicates with the manifold 100 to supply ink to each manifold 100. The coupling port 43 is a through hole that communicates with the through hole 32 of the sealing substrate 30, and a relay substrate 120 is inserted thereto.

In the liquid discharge head 510 of the present embodiment, the ink supplied from the ink tank 550 shown in FIG. 1 is taken from the supply port 44 shown in FIG. 5, and an internal flow path from the manifold 100 to the nozzle 21 is filled with ink. After that, a voltage based on the drive signal is applied to each of the piezoelectric elements 300 corresponding to the plurality of pressure chambers 12. As a result, the diaphragm 50 bends and deforms together with the piezoelectric element 300, the pressure in each pressure chamber 12 increases, and ink droplets are discharged from each nozzle 21.

Figure 6:
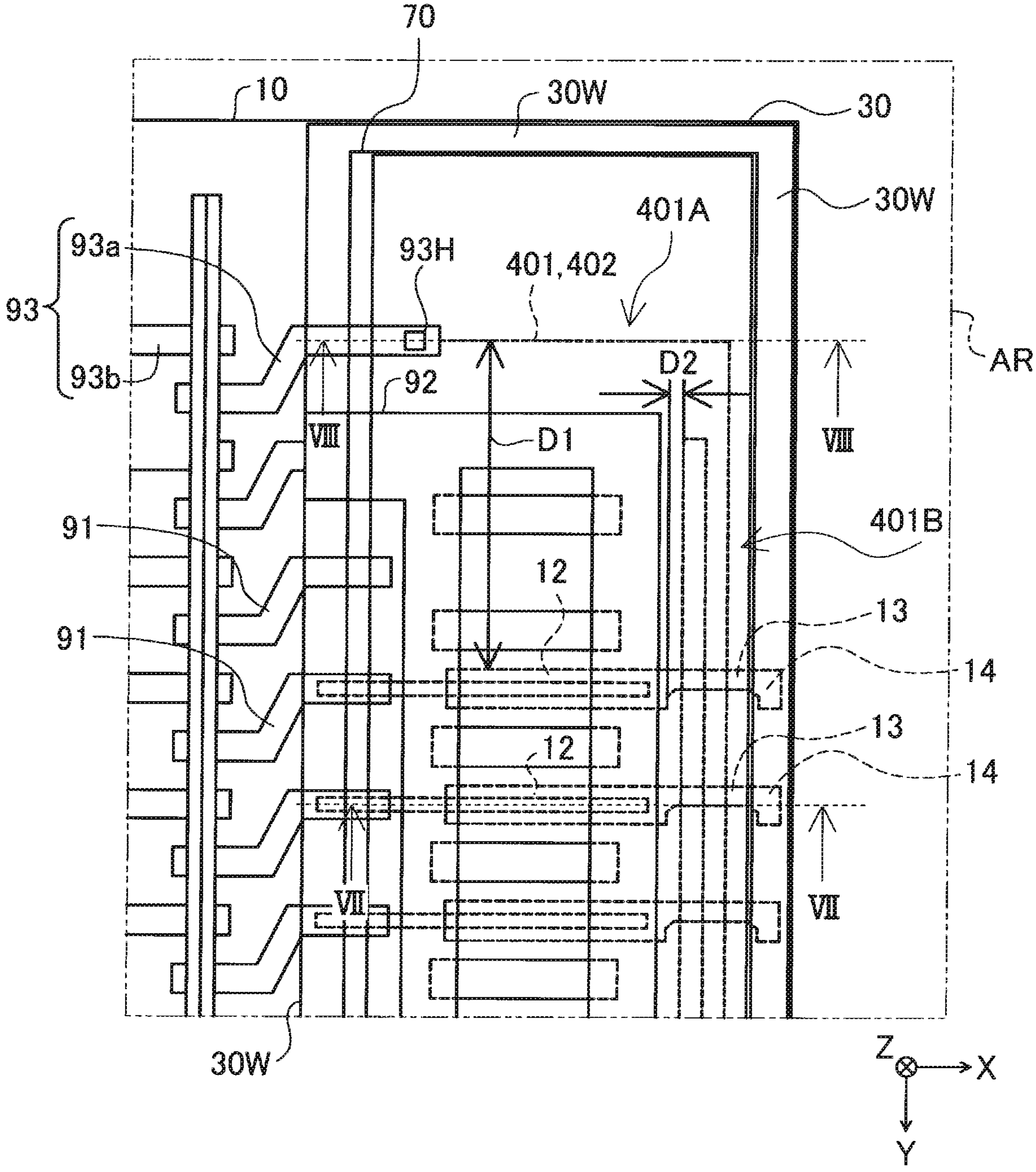
FIG. 6 is an enlarged cross-sectional view showing a partial range of FIG. 4.
Figure 7:
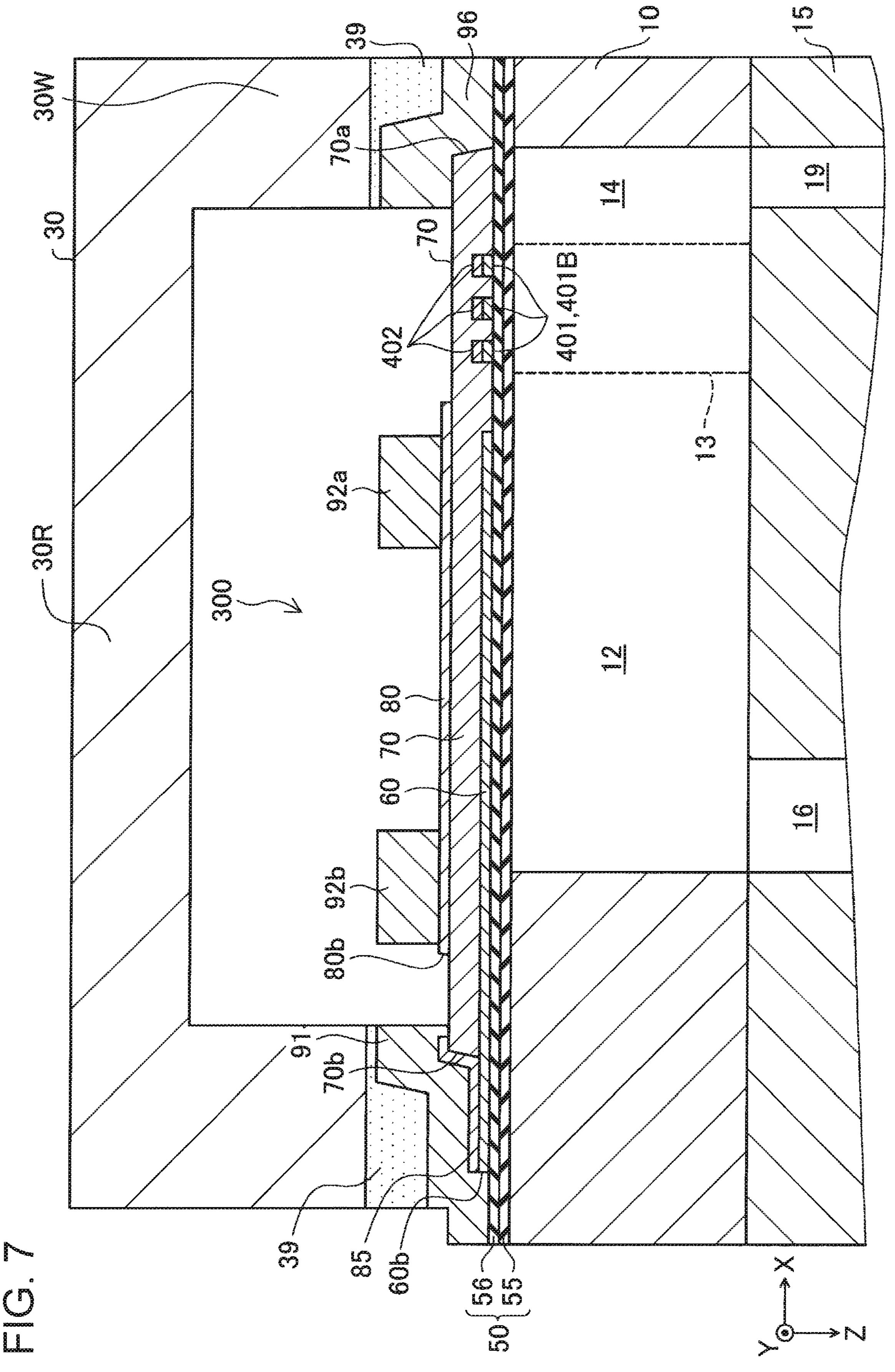
FIG. 7 is a cross-sectional view showing a VII-VII position of FIG. 6.
Figure 8:
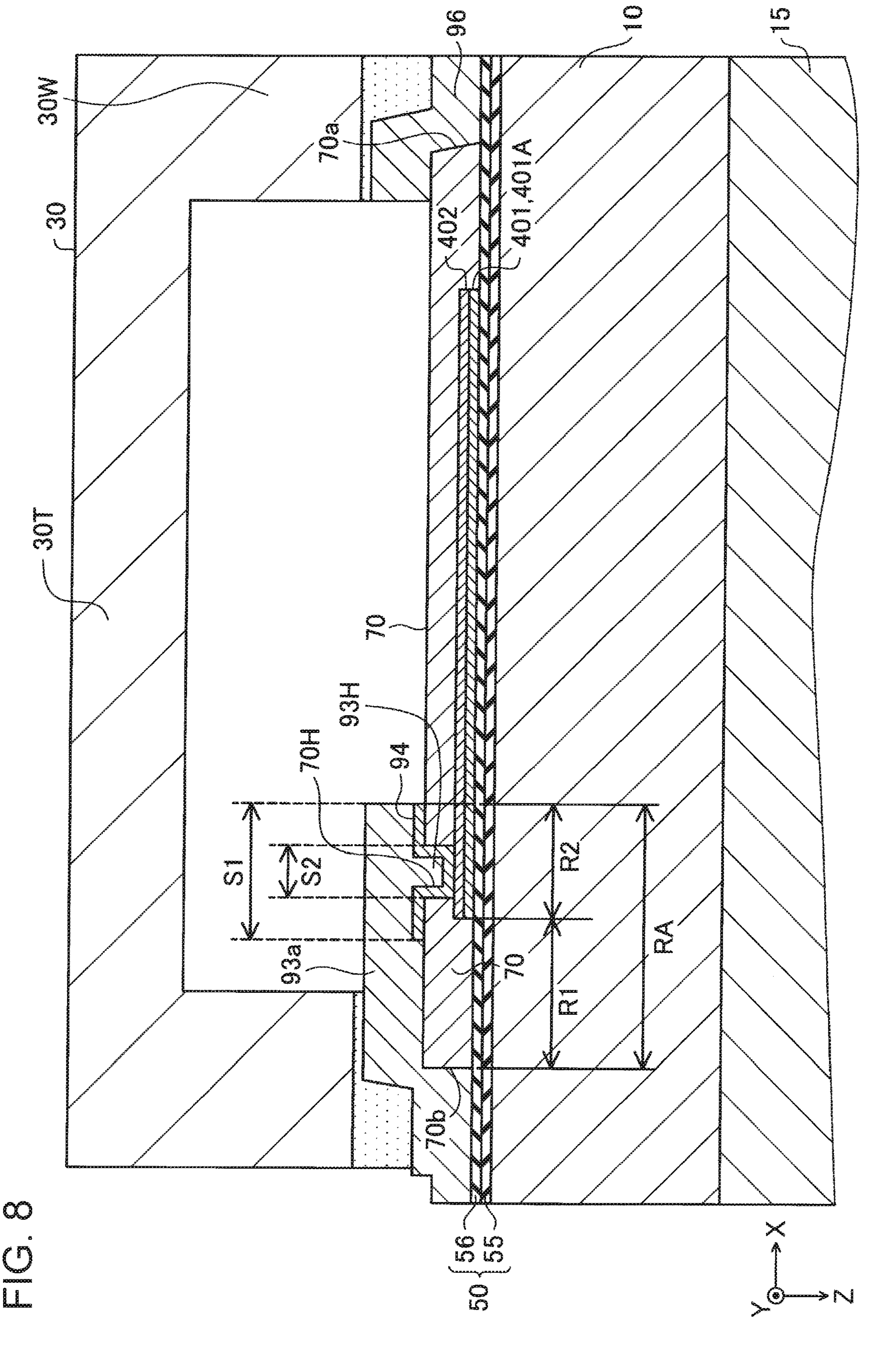
FIG. 8 is a cross-sectional view showing a VIII-VIII position of FIG. 6.

The configurations of the piezoelectric element 300 and the detection resistor 401 will be described with reference to FIGS. 6 to 8 together with FIGS. 4 and 5. FIG. 6 is an enlarged cross-sectional view showing the range AR of FIG. 4. FIG. 7 is a cross-sectional view showing a VII-VII position of FIG. 6. FIG. 8 is a cross-sectional view showing a VIII-VIII position of FIG. 6. As shown in FIG. 6, the liquid discharge head 510 further has an individual lead electrode 91, a common lead electrode 92, a measurement lead electrode 93, and a detection resistor 401, in addition to the diaphragm 50 and the piezoelectric element 300 on the −Z direction side of the pressure chamber substrate 10.

As shown in FIG. 7, the diaphragm 50 has an elastic film 55 provided on the pressure chamber substrate 10 side and formed of silicon oxide (SiO2), and an insulator film 56 provided on the elastic film 55 and formed of a zirconium oxide film (ZrO2). The flow path formed in the pressure chamber substrate 10 such as the pressure chamber 12 is formed by anisotropically etching the pressure chamber substrate 10 from the surface on the +Z direction side. The elastic film 55 constitutes a surface of the flow path, such as the pressure chamber 12, on the −Z direction side. In addition, the diaphragm 50 may be composed of, for example, either the elastic film 55 or the insulator film 56, and may further include another film other than the elastic film 55 and the insulator film 56. Examples of the material of the other film include silicon, silicon nitride, and the like.

The piezoelectric element 300 applies pressure to the pressure chamber 12. As shown in FIG. 7, the piezoelectric element 300 has a first electrode 60, a piezoelectric body 70, and a second electrode 80. As shown in FIG. 7, the first electrode 60, the piezoelectric body 70, and the second electrode 80 are laminated in order from the +Z direction side to the −Z direction side along the lamination direction. The piezoelectric body 70 is provided between the first electrode 60 and the second electrode 80 in the lamination direction in which the first electrode 60, the second electrode 80, and the piezoelectric body 70 are laminated.

Both the first electrode 60 and the second electrode 80 are electrically coupled to the relay substrate 120 shown in FIG. 5. The first electrode 60 and the second electrode 80 apply a voltage corresponding to the drive signal to the piezoelectric body 70. When a voltage is applied between the first electrode 60 and the second electrode 80, a part, at which piezoelectric distortion occurs in the piezoelectric body 70, in the piezoelectric element 300 is also referred to as an active portion. In the piezoelectric element 300, the active portion is a part in which the piezoelectric body 70 is sandwiched between the first electrode 60 and the second electrode 80.

A different drive voltage is supplied to the first electrode 60 according to the discharge amount of ink, and a constant reference voltage signal is supplied to the second electrode 80 regardless of the discharge amount of ink. When the active portion of the piezoelectric element 300 is driven and a potential difference is generated between the first electrode 60 and the second electrode 80, the piezoelectric body 70 is deformed. When the piezoelectric element 300 is driven, a part which actually displaces in the Z-axis direction is also called a flexible portion. In the piezoelectric element 300, a part facing the pressure chamber 12 in the Z-axis direction is the flexible portion. Due to the deformation of the piezoelectric body 70, the diaphragm 50 is deformed or vibrated, so that the volume of the pressure chamber 12 changes. Due to the change in the volume of the pressure chamber 12, pressure is applied to the ink accommodated in the pressure chamber 12, and the ink is discharged from the nozzle 21 via the nozzle communication path 16.

The first electrode 60 is an individual electrode that is individually provided for the plurality of pressure chambers 12. As shown in FIG. 7, the first electrode 60 is a lower electrode provided on an opposite side of the second electrode 80 while sandwiching the piezoelectric body 70 therebetween, that is, on the −Z direction side of the piezoelectric body 70, and is provided below the piezoelectric body 70. The thickness of the first electrode 60 is formed to be, for example, approximately 80 nanometers. For example, the first electrode 60 is formed of a conductive material including a metal, such as platinum (Pt), iridium (Ir), gold (Au), titanium (Ti), and a conductive metal oxide such as indium tin oxide abbreviated as ITO. The first electrode 60 may be formed by laminating a plurality of materials such as platinum (Pt), iridium (Ir), gold (Au), and titanium (Ti). In the present embodiment, platinum (Pt) is used as the first electrode 60.

As shown in FIG. 4, the piezoelectric body 70 has a predetermined width in the X-axis direction, and is provided to extend along the arrangement direction of the pressure chambers 12, that is, the Y-axis direction. As shown in FIG. 7, the end portion 70*a* of the piezoelectric body 70 in the +X direction is covered with a wiring portion 96 simultaneously formed with the individual lead electrodes 91. The thickness of the piezoelectric body 70 is formed, for example, from approximately 1000 nanometers to 4000 nanometers. Examples of the piezoelectric body 70 include a crystal film having a perovskite structure formed on the first electrode 60 and made of a ferroelectric ceramic material exhibiting an electromechanical conversion action, that is, a so-called perovskite type crystal. As the material of the piezoelectric body 70, for example, a ferroelectric piezoelectric material such as lead zirconate titanate (PZT) or a material to which a metal oxide, such as niobium oxide, nickel oxide, or magnesium oxide, is added is used. Specifically, lead titanate (PbTiO3), lead zirconate titanate (Pb(Zr, Ti) O3), lead zirconate (PbZrO3), lead lanthanum titanate ((Pb, La), TiO3), lead lanthanum zirconate titanate ((Pb, La)(Zr, Ti)O3), lead magnesium niobate zirconate (Pb(Zr, Ti)(Mg, Nb)O3), or the like can be used. In the present embodiment, lead zirconate titanate (PZT) is used as the piezoelectric body 70.

The material of the piezoelectric body 70 is not limited to the lead-based piezoelectric material containing lead, and a non-lead-based piezoelectric material containing no lead can also be used. Examples of the non-lead-based piezoelectric material include bismuth iron acid ((BiFeO3), abbreviated as "BFO"), barium titanate ((BaTiO3), abbreviated as "BT"), potassium sodium niobate ((K, Na)(NbO3), abbreviated as "KNN"), potassium sodium lithium niobate ((K, Na, Li)(NbO3)), potassium sodium lithium tantalate niobate ((K, Na, Li)(Nb, Ta)O3), bismuth potassium titanate ((Bi½K½) TiO3, abbreviated as "BKT"), bismuth sodium titanate ((Bi½Na½) TiO3, abbreviated as "BNT"), bismuth manganate (BimnO3, abbreviated as "BM"), composite oxide containing bismuth, potassium, titanium and iron and having a perovskite structure (x[(BixK1−x)TiO3]−(1−x)[BiFeO3], abbreviated as "BKT-BF"), composite oxide containing bismuth, iron, barium and titanium and having a perovskite structure ((1−x)[BiFeO3]−x[BaTiO3], abbreviated as "BFO-BT"), and a material ((1−x)[Bi(Fe1−yMy)O3]−x[BaTiO3] (M is Mn, Co or Cr)), which is obtained by adding metals, such as manganese, cobalt, and chromium, to the composite oxide.

As shown in FIG. 4, the second electrode 80 is a common electrode that is commonly provided with respect to the plurality of pressure chambers 12. The second electrode 80 has a predetermined width in the X-axis direction, and is provided to extend along the arrangement direction of the pressure chambers 12, that is, the Y-axis direction. As shown in FIG. 7, the second electrode 80 is an upper electrode provided above the piezoelectric body 70 on an opposite side of the first electrode 60 while sandwiching the piezoelectric body 70 therebetween, that is, on the −Z direction side of the piezoelectric body 70. The material of the second electrode 80 is not particularly limited, but, similar to the first electrode 60, for example, metals, such as platinum (Pt), iridium (Ir), gold (Au), and titanium (Ti), and conductive materials including conductive metal oxides, such as indium tin oxide abbreviated as ITO, are used. Alternatively, a plurality of materials such as platinum (Pt), iridium (Ir), gold (Au), and titanium (Ti) may be laminated and formed. In the present embodiment, iridium (Ir) is used as the second electrode 80.

As shown in FIG. 7, a wiring portion 85 is provided on the −X direction side rather than the end portion 80*b* of the second electrode 80 in the −X direction. The wiring portion 85 is in the same layer as the second electrode 80, but is electrically discontinuous with the second electrode 80. The wiring portion 85 is formed from the end portion 70*b* of the piezoelectric body 70 in the −X direction to the end portion 60*b* of the first electrode 60 in the −X direction in a state of being spaced from the end portion 80*b* of the second electrode 80. The end portion 60*b* of the first electrode 60 in the −X direction is pulled out from the end portion 70*b* of the piezoelectric body 70 to the outside. The wiring portion 85 is provided for each piezoelectric element 300, and a plurality of wiring portions 85 are disposed at predetermined intervals along the Y-axis direction. It is preferable that the wiring portion 85 is formed in the same layer as the second electrode 80. As a result, the cost can be reduced by simplifying a manufacturing process of the wiring portion 85. However, the wiring portion 85 may be formed in a layer different from the layer of the second electrode 80.

As shown in FIGS. 6 and 7, the individual lead electrode 91 is electrically coupled to the first electrode 60 which is an individual electrode, and an extension portion 92*a* and an extension portion 92*b* of the common lead electrode 92 is electrically coupled to the second electrode 80 which is a common electrode. The individual lead electrode 91 and the common lead electrode 92 function as drive wirings for applying a voltage for driving the piezoelectric body 70 to the piezoelectric body 70. In the present embodiment, a power supply circuit for supplying electric power to the piezoelectric body 70 via the drive wiring and the current application circuit 430 for supplying electric power to the detection resistor 401 are different circuits from each other.

The materials of the individual lead electrode 91 and the common lead electrode 92 are conductive materials. For example, gold (Au), copper (Cu), titanium (Ti), tungsten (W), nickel (Ni), chromium (Cr), platinum (Pt), aluminum (Al), and the like can be used. In the present embodiment, gold (Au) is used as the individual lead electrode 91 and the common lead electrode 92. Further, the individual lead electrode 91 and the common lead electrode 92 may have an adhesion layer for improving the adhesion with the first electrode 60, the second electrode 80, and the diaphragm 50.

The individual lead electrode 91 and the common lead electrode 92 are formed in the same layer so as to be electrically discontinuous. As a result, as compared with when the individual lead electrode 91 and the common lead electrode 92 are individually formed, the cost can be reduced by simplifying the manufacturing process. The individual lead electrode 91 and the common lead electrode 92 may be formed in different layers.

As shown in FIG. 6, the individual lead electrode 91 is provided for each first electrode 60. As shown in FIG. 7, the individual lead electrode 91 is coupled to the vicinity of the end portion 60*b* of the first electrode 60 via the wiring portion 85, and is pulled out in the −X direction to a top of the diaphragm 50. The individual lead electrode 91 electrically coupled to the first electrode 60 is also referred to as a "second wiring portion". The individual lead electrode 91 is electrically coupled to the end portion 60*b* of the first electrode 60, which is pulled out from the end portion 70*b* of the piezoelectric body 70 to the outside, in the −X direction. The wiring portion 85 may be omitted, and the individual lead electrode 91 may be directly coupled to the end portion 60*b* of the first electrode 60.

As shown in FIG. 4, the common lead electrode 92 extends along the Y-axis direction, bends at both ends in the Y-axis direction, and is pulled out in the −X direction. The common lead electrode 92 has an extension portion 92*a* extending along the Y-axis direction and an extension portion 92*b*. As shown in FIGS. 4 and 5, the individual lead electrode 91 and the common lead electrode 92 are extended to be exposed in the through hole 32 formed in the sealing substrate 30, and are electrically coupled to the relay substrate 120 in the through hole 32.

The relay substrate 120 is composed of, for example, a Flexible Printed Circuit (FPC). The relay substrate 120 is formed with a plurality of wirings for being coupled to the control section 580 and a power supply circuit (not shown). In addition, the relay substrate 120 may be composed of any flexible substrate, such as Flexible Flat Cable (FFC), instead of FPC. An integrated circuit 121 having a switching element is mounted at the relay substrate 120. A signal for driving the piezoelectric element 300 is input to the integrated circuit 121. The integrated circuit 121 controls a timing at which the signal for driving the piezoelectric element 300 is supplied to the first electrode 60 based on the input signal. As a result, the timing at which the piezoelectric element 300 is driven and the drive amount of the piezoelectric element 300 are controlled.

As shown in FIG. 4, the detection resistor 401 is further provided on the surface of the diaphragm 50 on the −Z direction side. As shown in FIG. 4, in the present embodiment, the detection resistor 401 is continuously formed so as to surround the periphery of the first pressure chamber row L1 and the second pressure chamber row L2 in a plan view. More specifically, the detection resistor 401 is electrically coupled to the measurement lead electrode 93 which is a first wiring portion, and includes a first extending part 401A which extends along the intersection direction on the outside the plurality of pressure chambers 12 in the −Y direction, a second extending part 401B which is continuous from the first extending part 401A and extends along the arrangement direction, and a third extending part 401C which extends along the intersection direction outside the plurality of pressure chambers 12 in the +Y direction.

In the example of FIG. 4, the second extending part 401B of the detection resistor 401 is formed as a so-called meandering pattern to be reciprocated a plurality of times in the vicinity of the first pressure chamber row L1 and the second pressure chamber row L2 along the arrangement direction. With the configuration, it is possible to improve the temperature detection accuracy of the ink in the pressure chamber 12 by the detection resistor 401. However, the second extending part 401B of the detection resistor 401 is not limited to the meandering pattern, and may be formed, for example, in any shape such as a linear shape.

As shown in FIGS. 6 and 7, the detection resistor 401 is disposed so as to pass in the vicinity of the ink flow path in the pressure chamber substrate 10. In the detection resistor 401, the second extending part 401B is disposed so as to pass through the −Z direction side with respect to the throttle portion 13 in the vicinity of each pressure chamber 12 while sandwiching the diaphragm 50. From this, it can be considered that the second extending part 401B is a part that can contribute most to the detection of the temperature of the ink in the pressure chamber 12. The first extending part 401A and the third extending part 401C are separated from the pressure chamber 12, and can be considered to be parts that are less likely to contribute to detection of the temperature than the second extending part 401B.

In FIG. 6, a first distance D1 which is the shortest distance from the first extending part 401A to the plurality of pressure chambers 12 and a second distance which is the shortest distance from the second extending part 401B to the plurality of pressure chambers 12 D2 are schematically shown. In the present embodiment, the first distance D1 is longer than the second distance D2. As the length of the wiring increases, the resistance value increases, and noise such as energy loss and attenuation of the electric signal is likely to occur. Therefore, in order to suppress the noise such as energy loss and attenuation of the electric signal, it is considered that it is preferable that the wiring length of the first extending part 401A and the wiring length of the third extending part 401C, which are separated from the pressure chamber 12, are as short as possible. In addition, in the present disclosure, the plurality of pressure chambers 12 are communicated with the nozzles 21 and are provided with the piezoelectric elements 300. For example, so-called dummy pressure chambers, such as a pressure chamber which is not communicated with the nozzle 21 and a pressure chamber which is not correspondingly provided with the piezoelectric element 300, are interpreted as being different from the "plurality of pressure chambers 12" in the present disclosure. For example, when the shortest distance from the first extending part 401A to the "plurality of pressure chambers 12" that contributes to the discharge of the liquid is the first distance D1 and the first distance D1 is longer than the second distance D2, the shortest distance from the first extending part 401A to the dummy pressure chamber may be shorter than the second distance D2. In this case, since the distance from the first extending part 401A is short, noise may occur in the dummy pressure chamber. However, since the dummy pressure chamber does not contribute to the discharge at all, it does not matter, and, rather, it is possible to obtain an effect of reducing the overall size of the liquid discharge head 510.

The material of the detection resistor 401 is a material whose electric resistance value is temperature dependent. For example, gold (Au), platinum (Pt), iridium (Ir), aluminum (Al), copper (Cu), titanium (Ti), tungsten (W), nickel (Ni), chromium (Cr), and the like can be used. Here, platinum (Pt) can be preferably used as a material for the detection resistor 401 from a viewpoint that the change in electric resistance with temperature is large and stability and accuracy are high.

As shown in FIG. 7, in the present embodiment, the detection resistor 401 is in the same layer as the first electrode 60 in the lamination direction, and is formed to be electrically discontinuous with the first electrode 60. In the present embodiment, the detection resistor 401 is formed together with the first electrode 60 in a step of forming the first electrode 60. The material of the detection resistor 401 is platinum (Pt), which is the same as that of the first electrode 60, and the thickness of the detection resistor 401 is approximately 80 nanometers similar to the first electrode 60. However, the present disclosure is not limited thereto, and the detection resistor 401 may be individually formed separately from the first electrode 60, or may be formed in a different layer from the first electrode 60.

As shown in FIG. 7, in the present embodiment, a low thermal conductive layer 402 is laminated on the detection resistor 401. Specifically, the low thermal conductive layer 402 is provided on a surface opposite to the surface facing the pressure chamber substrate 10, that is, a surface on the −Z direction side in the detection resistor 401. The low thermal conductive layer 402 is a layer having a lower thermal conductivity than the detection resistor 401.

The low thermal conductive layer 402 is laminated above the detection resistor 401 and is covered with the piezoelectric body 70 together with the detection resistor 401. As will be described later, from a viewpoint of facilitating the electrical coupling between the measurement lead electrode 93 and the detection resistor 401 via a contact hole 93H, it is preferable that the low thermal conductive layer 402 is formed of a material, such as metal, having conductivity. By providing a layer having a low thermal conductivity on the surface opposite to the surface facing the pressure chamber substrate 10 in the detection resistor 401, it is possible to suppress the heat transferred from the ink in the pressure chamber 12 to the detection resistor 401 from being dissipated from the surface opposite to the surface facing the pressure chamber substrate 10. It is preferable that the thickness of the low thermal conductive layer 402 is as thick as possible in order to more reliably suppress heat dissipation from the detection resistor 401. The low thermal conductive layer 402 does not necessarily have to be in contact with the detection resistor 401. For example, between the detection resistor 401 and the low thermal conductive layer 402, for example, an adhesion layer, such as iridium (Ir), for improving the adhesion with the detection resistor 401 and the low thermal conductive layer 402 may be disposed. The low thermal conductive layer 402 can be omitted, and in the following description, the configuration of the low thermal conductive layer 402 will be described after being omitted unless otherwise specified.

FIG. 6 shows the measurement lead electrode 93. The measurement lead electrode 93 is the first wiring portion electrically coupled to the detection resistor 401. In the present embodiment, the measurement lead electrode 93 is formed in the same layer as the individual lead electrode 91 and the common lead electrode 92, and is formed to be electrically discontinuous from each other. The detection resistor 401 is electrically coupled to the relay substrate 120 by the measurement lead electrode 93. Therefore, the temperature calculation section 450 can detect the electric resistance value of the detection resistor 401.

In the present embodiment, the electric resistance value per unit length of the detection resistor 401 is set to be higher than the electric resistance value per unit length of the measurement lead electrode 93. The electric resistance value per unit length depends on the cross-sectional region, the material, or the like of the wiring. The material of the measurement lead electrode 93 is a conductive material, and includes, for example, gold (Au), copper (Cu), titanium (Ti), tungsten (W), nickel (Ni), chromium (Cr), platinum (Pt), aluminum (Al), and the like. In the present embodiment, gold (Au) having an electric resistance value smaller than that of the detection resistor as platinum (Pt) is used for the measurement lead electrode 93. In addition, the material of the measurement lead electrode 93 is the same as the materials of the individual lead electrode 91 and the common lead electrode 92. Any material other than gold (Au) may be used for the measurement lead electrode 93, and the material may be different from those of the individual lead electrode 91 and the common lead electrode 92. Instead of the material, the electric resistance value of the measurement lead electrode 93 may be set to be lower than that of the detection resistor 401 by increasing the cross-sectional region of the wiring.

As shown in FIG. 8, the measurement lead electrode 93 includes wiring portions 93*a* and 93*b* that are extending above the piezoelectric body 70, and the contact hole 93H that is provided in the through hole 70H penetrating the piezoelectric body 70. The through hole 70H can be formed when the piezoelectric body 70 is formed by, for example, ion milling at the time of forming the piezoelectric body 70. A wiring portion 93*a* is electrically coupled to the detection resistor 401 via the contact hole 93H. Although not shown, similarly, the wiring portion 93*b* is also coupled to the wiring portion 93*b* via the contact hole 93H. The wiring portions 93*a* and 93*b* are also referred to as a "first part", and the contact hole 93H is also referred to as a "second part". The contact hole 93H may be provided in only any of the wiring portions 93*a* and 93*b*. As shown in FIGS. 6 and 8, the contact hole 93H is provided at a position inside the wall portion 30W of the sealing substrate 30 and overlapping the ceiling portion 30T, and a coupling part between the wiring portion 93*a* and the detection resistor 401 is accommodated in the holding portion 31 of the sealing substrate 30.

FIG. 8 shows a region RA in which the piezoelectric body 70 and the wiring portion 93*a* as the first wiring portion overlap when viewed along the lamination direction. Further, in the region RA, a range R1 in which the detection resistor 401 is not disposed and a range R2 in which the detection resistor 401 is disposed are shown. In the present embodiment, the range R2 in which the detection resistor 401 is disposed is set to be narrower than the range R1 in which the detection resistor 401 is not disposed. In this way, by setting the part where the detection resistor 401 and the wiring portion 93*a* overlap to be narrow, the first extending part 401A in the detection resistor 401 is set to be small.

As shown in FIG. 8, in the present embodiment, a protective layer 94 is further provided between the contact hole 93H and the detection resistor 401. The protective layer 94 is formed of the same material as the second electrode 80, and in present embodiment, it is formed of iridium (Ir). The protective layer 94 is conductive, and the contact hole 93H of the measurement lead electrode 93 is electrically coupled to the detection resistor 401 via the protective layer 94. The protective layer 94 is laminated above the detection resistor 401 exposed from the through hole 70H of the piezoelectric body 70, so that it is possible to protect the detection resistor 401 from damage caused by, for example, etching or the like when the second electrode 80 is formed. As a result, the occurrence of film thickness variation of the detection resistor 401 is suppressed, and the decrease in the temperature detection accuracy is reduced or prevented.

Figure 9:
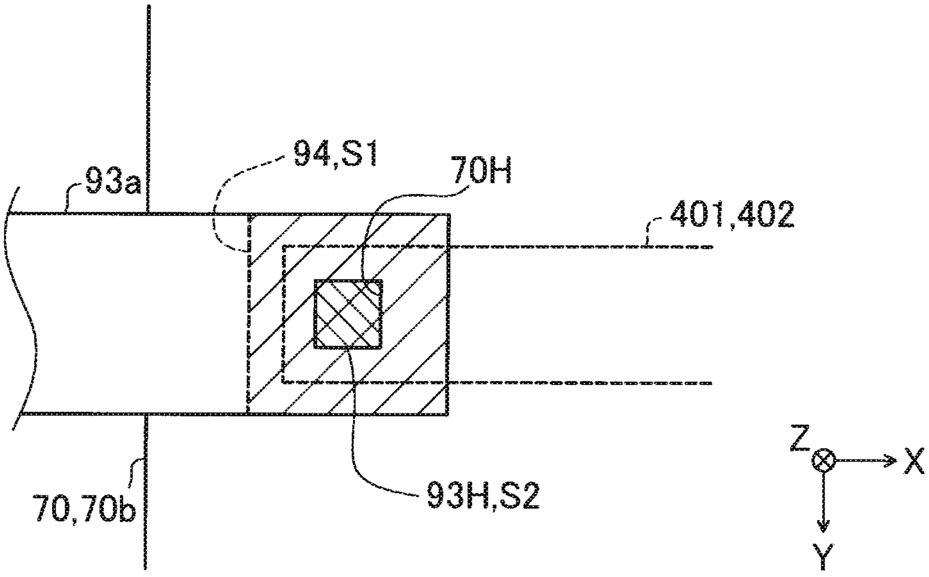
FIG. 9 is an explanatory view showing an enlarged protective layer in a plan view.

FIG. 9 is an explanatory view showing the protective layer 94 enlarged in a plan view. FIG. 9 schematically shows the measurement lead electrode 93, the protective layer 94, and the detection resistor 401. In addition, in FIG. 9, each of the protective layer 94 and the contact hole 93H is hatched for easy understanding of the technique. In the present embodiment, as shown in FIG. 9, the space S1 of the protective layer 94 is designed to be wider than the space S2 of the contact hole 93H in a plan view. In this way, the protective layer 94 is set to cover the through hole 70H so that the detection resistor 401 in the through hole 70H is not exposed. As a result, it is possible to reduce damage to the detection resistor 401 during a manufacturing process due to etching or the like, as compared with when at least a part of the detection resistor 401 is not covered with the protective layer 94 and is exposed from the through hole 70H.

As described above, the liquid discharge head 510 of the present embodiment includes the pressure chamber substrate 10 that is provided with the plurality of pressure chambers 12, the piezoelectric body 70 that is driven to apply pressure to the ink in the pressure chambers 12, the second electrode 80 that is provided above the piezoelectric body 70 and functions as the upper electrode for applying the voltage to the piezoelectric body 70, the first electrode 60 that is provided below the piezoelectric body 70 and functions as the lower electrode for applying the voltage to the piezoelectric body 70, the detection resistor 401 that is provided below the piezoelectric body 70 for detecting the temperature of the ink in the pressure chamber 12, and the measurement lead electrode 93 as the first wiring portion electrically coupled to the detection resistor 401. The measurement lead electrode 93 includes the wiring portion 93*a* as the first part extending above the piezoelectric body 70, and the contact hole 93H that is provided in at least a part of the through hole 32 penetrating the piezoelectric body 70 and functions as the second part electrically coupled to the detection resistor 401. By electrically coupling the detection resistor 401 and the measurement lead electrode 93 using the through hole 70H of the piezoelectric body 70, it is possible to shorten the wiring length of the detection resistor 401 as compared with a structure in which the detection resistor 401 is extended from the end portion 70*b* of the piezoelectric body 70 to the outside to be electrically coupled to the measurement lead electrode 93. Therefore, it is possible to suppress energy loss and signal attenuation in the detection resistor 401 and improve the temperature detection accuracy. Further, since the through hole 70H of the piezoelectric body 70 is used, it is possible to electrically couple the detection resistor 401 and the measurement lead electrode 93 using a simple method as compared with when the detection resistor 401 is exposed from the end portion 70*b* of the piezoelectric body 70 by, for example, etching or the like.

The liquid discharge head 510 of the present embodiment further includes the individual lead electrode 91 and the common lead electrode 92 as a second wiring portion electrically coupled to the first electrode 60 as the lower electrode. The individual lead electrode 91 and the common lead electrode 92 are electrically coupled to a lower electrode pulled out from the end portion 70*b* of the piezoelectric body 70 to the outside. By pulling out the lower electrode from the end portion 70*b* of the piezoelectric body 70 to the outside, the contact space between the lower electrode and the piezoelectric body 70 can be increased. As a result, the space of the active portion of the piezoelectric element 300 is increased, so that it is possible to improve ink discharge performance.

According to the liquid discharge head 510 of the present embodiment, when viewed along the lamination direction, in the region RA where the piezoelectric body 70 and the measurement lead electrode 93 overlap, the range R2 in which the detection resistor 401 is disposed is narrower than the range R1 in which the detection resistor 401 is not disposed. By setting the part where the detection resistor 401 and the wiring portion 93*a* overlap to be narrow, the first extending part 401A in the detection resistor 401 is set to be small. Therefore, it is possible to suppress energy loss and signal attenuation in the detection resistor 401 and improve the temperature detection accuracy.

The liquid discharge head 510 of the present embodiment further includes the sealing substrate 30 that has the wall portion 30W and the ceiling portion 30T, and protects the active portion of the piezoelectric body 70 by the wall portion 30W and the ceiling portion 30T. The contact hole 93H is provided at a position overlapping the ceiling portion 30T when viewed along the lamination direction. By covering with the sealing substrate 30, it is possible to protect the electrical coupling part between the wiring portion 93*a* and the detection resistor 401, and suppress defects such as electrical opening and short circuit between the wiring portion 93*a* and the detection resistor 401.

The liquid discharge head 510 of the present embodiment further includes the protective layer 94 formed of the same material as the upper electrode between the contact hole 93H and the detection resistor 401. The contact hole 93H is electrically coupled to the detection resistor 401 via the protective layer 94. By laminating the protective layer 94 above the detection resistor 401 exposed from the through hole 70H of the piezoelectric body 70, it is possible to protect the detection resistor 401 from, for example, damage due to etching when the second electrode 80 is formed. As a result, it is possible to suppress the occurrence of film thickness variation of the detection resistor 401 and suppress the decrease in the temperature detection accuracy.

According to the liquid discharge head 510 of the present embodiment, when viewed along the lamination direction, the through hole 70H is covered with the protective layer 94 having the space S1 wider than the space S2 of the contact hole 93H. By setting the protective layer 94 to cover the detection resistor 401 exposed from the through hole 70H, it is possible to reduce damage to the detection resistor 401 during a manufacturing process due to etching or the like, as compared with when at least a part of the detection resistor 401 is exposed from the through hole 70H.

According to the liquid discharge head 510 of the present embodiment, the electric resistance value per unit length of the detection resistor 401 is higher than the electric resistance value per unit length of the measurement lead electrode 93. It is possible to improve the temperature detection accuracy by increasing the electric resistance value of the detection resistor 401, and, further, it is possible to increase the temperature detection accuracy by suppressing the energy loss and signal attenuation of the measurement lead electrode 93, which does not directly contribute to the temperature detection.

According to the liquid discharge head 510 of the present embodiment, when the direction in which the plurality of pressure chambers 12 are arranged is set as the arrangement direction and the direction orthogonal to both of the arrangement direction and the lamination direction is the intersection direction, the detection resistor 401 has the first extending part 401A that is electrically coupled to the measurement lead electrode 93 and extends along the intersection direction on the outer side than the plurality of pressure chambers 12, and the second extending part 401B that is continuous from the first extending part 401A and extends along the arrangement direction. By disposing the second extending part 401B along the arrangement direction of the plurality of pressure chambers 12, it is possible to efficiently dispose the detection resistor 401 around the plurality of pressure chambers 12 from a viewpoint of the temperature detection of the plurality of pressure chambers 12.

According to the liquid discharge head 510 of the present embodiment, when the shortest distance from the first extending part 401A to the plurality of pressure chambers 12 is set as the first distance D1 and the shortest distance from the second extending part 401B to the plurality of pressure chambers 12 is set as the second distance D2, the first distance D1 is longer than the second distance D2. By disposing the second extending part 401B, which is arranged along the arrangement direction of the pressure chambers 12, in the vicinity of the plurality of pressure chambers 12 rather than the first extending part 401A coupled to the measurement lead electrode 93, it is possible to efficiently dispose the detection resistor 401 around the plurality of pressure chambers 12 from the viewpoint of the temperature detection of the plurality of pressure chambers 12.

The liquid discharge device 500 of the present embodiment includes the liquid discharge head 510, and the control section 580 that controls the discharge operation of the liquid discharge head 510. Therefore, energy loss and signal attenuation are suppressed in the detection resistor 401, so that it is possible to provide the liquid discharge device 500 having the high temperature detection accuracy.

B. Second Embodiment

Figure 10:
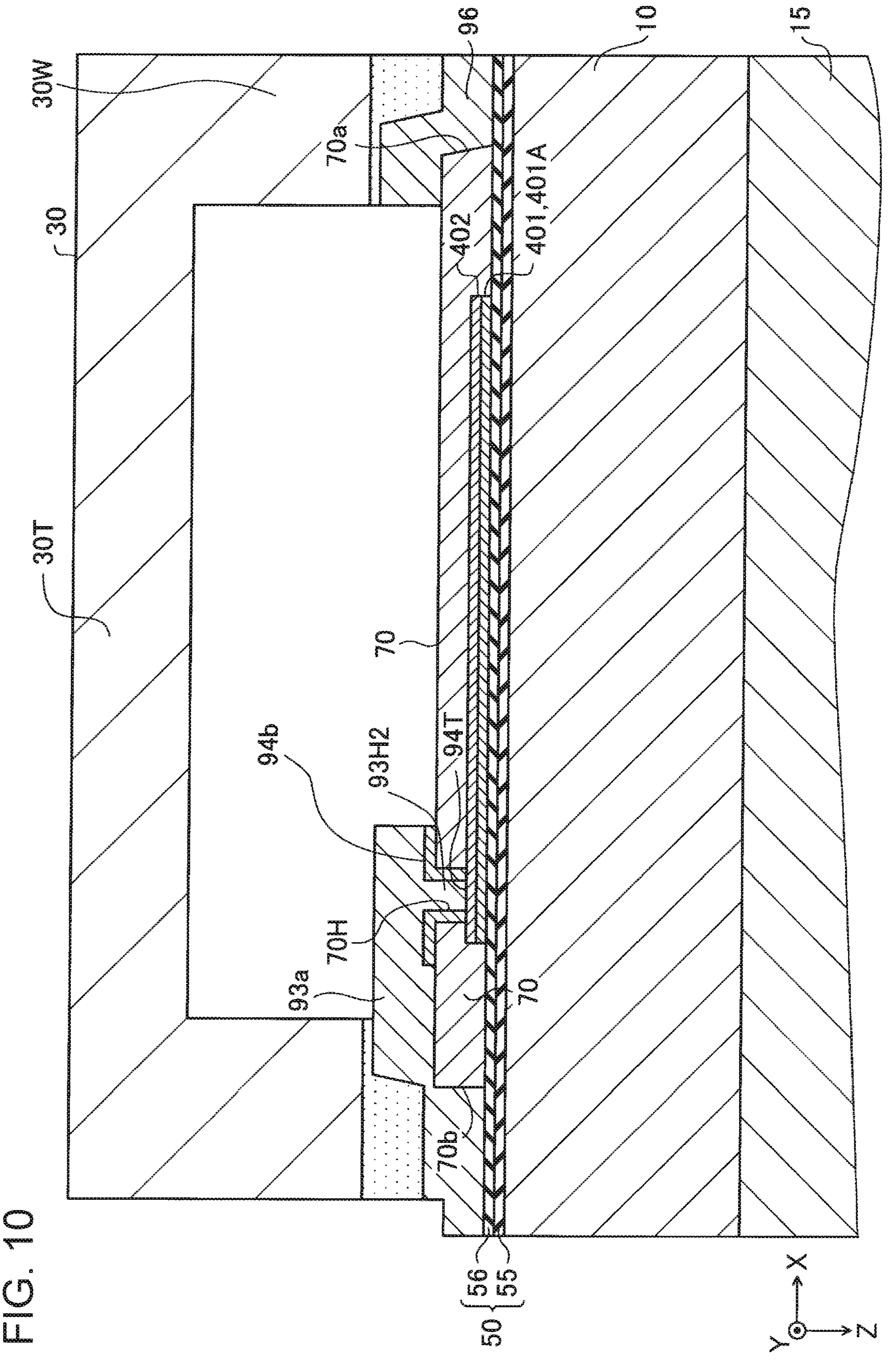
FIG. 10 is a cross-sectional view showing a structure in the vicinity of a contact hole included in a liquid discharge head as a second embodiment.

FIG. 10 is a cross-sectional view showing a structure in the vicinity of a contact hole 93H2 included in a liquid discharge head 510 as a second embodiment of the present disclosure. The liquid discharge head 510 of the second embodiment is different from the liquid discharge head 510 of the first embodiment in a fact that the contact hole 93H2 is provided instead of the contact hole 93H and a protective layer 94*b* is provided instead of the protective layer 94 between the contact hole 93H2 and the detection resistor 401, and the other configurations are the same as in the liquid discharge head 510 of the first embodiment.

The protective layer 94*b* is different from the protective layer 94 in a fact that an opening portion 94T is provided, and the other configurations are the same as in the protective layer 94. In the present embodiment, the contact hole 93H2 of the measurement lead electrode 93 is electrically coupled to the detection resistor 401 via a part of the protective layer 94*b* and is electrically coupled to the detection resistor 401 via the protective layer 94*b* which is in contact with the detection resistor 401 via the opening portion 94T. In this way, when the protective layer 94*b* is provided, the contact hole 93H2 is not limited to the aspect of being electrically coupled to the detection resistor 401 via only the protective layer 94*b*, may be electrically coupled to the detection resistor 401 via a part of the protective layer 94*b*, or may be electrically coupled to the detection resistor 401 in such a way that the contact hole 93H2 is in contact with the detection resistor 401 instead of or together with the protective layer 94*b*.

For example, similar to the protective layer 94 of the first embodiment, as a method for forming the opening portion 94T, the protective layer 94*b* that covers the detection resistor 401 is formed so that the detection resistor 401 in the through hole 70H is not exposed when the second electrode 80 is formed. The opening portion 94T can be formed by removing a part of the protective layer 94*b*, which is located on the bottom surface of the through hole 70H by, for example, etching, such as ion milling, in the formed protective layer 94*b*.

According to the liquid discharge head 510 of the present embodiment, the contact hole 93H2 is electrically coupled to the detection resistor 401 via the opening portion 94T provided in the protective layer 94*b*. Therefore, the contact hole 93H2 can be in contact with the detection resistor 401 while including the protective layer 94*b*, the electric resistance between the detection resistor 401 and the contact hole 93H2 can be reduced, and the temperature detection accuracy can be improved. Further, for example, by forming the opening portion 94T after forming the second electrode 80, damage to the detection resistor 401 due to etching during the formation of the second electrode 80 is suppressed by the protective layer 94*b* in a state of covering the detection resistor 401, so that it is possible to suppress the occurrence of the film thickness variation of the detection resistor 401.

C. Third Embodiment

Figure 11:
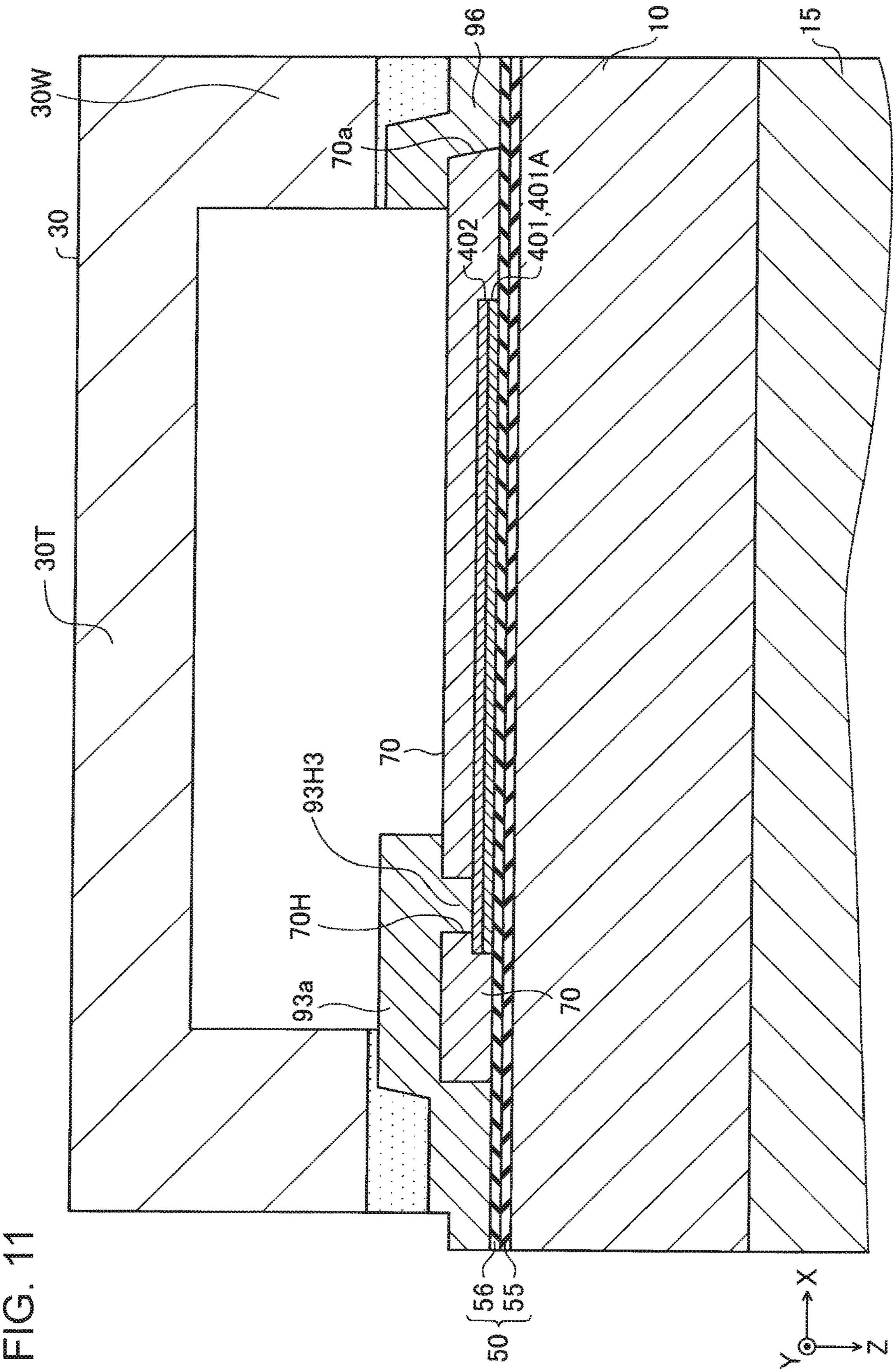
FIG. 11 is a cross-sectional view showing a structure in the vicinity of a contact hole included in a liquid discharge head as a third embodiment.

FIG. 11 is a cross-sectional view showing a structure in the vicinity of a contact hole 93H3 included in the liquid discharge head 510 as a third embodiment. The liquid discharge head 510 of the third embodiment is different from the liquid discharge head 510 of the first embodiment in a fact that the contact hole 93H3 is provided instead of the contact hole 93H and the protective layer 94 is not provided between the contact hole 93H3 and the detection resistor 401, and the other configurations are the same as in the liquid discharge head 510 of the first embodiment.

According to the liquid discharge head 510 of the present embodiment, the contact hole 93H3 is provided by filling the through hole 70H of the piezoelectric body 70. Therefore, as compared with the aspect in which the liquid discharge head 510 includes the protective layer 94, the electric resistance between the detection resistor 401 and the contact hole 93H3 is reduced by increasing the space where the contact hole 93H3 is in contact with the detection resistor 401, so that of the temperature detection accuracy can be improved.

D. Fourth Embodiment

Figure 12:
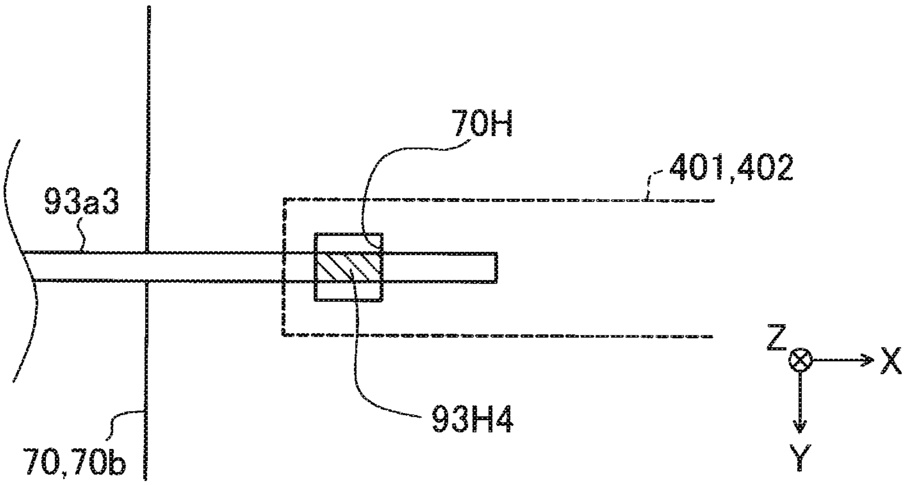
FIG. 12 is an explanatory view showing a structure in the vicinity of a contact hole of a liquid discharge head as a fourth embodiment in a plan view.

FIG. 12 is an explanatory view showing a structure in the vicinity of a contact hole 93H4 included in a liquid discharge head 510 as a fourth embodiment in a plan view. The liquid discharge head 510 of the fourth embodiment is different from the liquid discharge head 510 of the first embodiment in a fact that a contact hole 93H4 is provided instead of the contact hole 93H and the protective layer 94 is not provided between the contact hole 93H4 and the detection resistor 401, and the other configurations are the same as in the liquid discharge head 510 of the first embodiment. In FIG. 12, the contact hole 93H4 is hatched for easy understanding of the technique.

As shown in FIG. 12, in a plan view, the contact hole 93H4 is formed only at the center of the through hole 70H in the Y-axis direction over the entire width direction along the X-axis direction. In this way, the contact hole 93H4 may not fill the through hole 70H, and may be formed at a part of the through hole 70H. According to the liquid discharge head 510 configured in this way, the measurement lead electrode 93 and the detection resistor 401 can be electrically coupled by the contact hole 93H4 having a shape corresponding to the shape of the measurement lead electrode 93. In addition, the position where the contact hole 93H4 is formed in the through hole 70H is not limited to the example of FIG. 12, and may be formed at any position in the through hole 70H.

E. Other Embodiments (E1) In each of the above embodiments, an example is shown in which the second electrode 80 as the common electrode is provided above the piezoelectric body 70 and the first electrode 60 as the individual electrode is provided below the piezoelectric body 70. On the other hand, the common electrode may be the lower electrode provided below the piezoelectric body 70, and the individual electrode may be the upper electrode provided above the piezoelectric body 70. In this case, it is preferable that the detection resistor 401 is formed by using the same material as the lower electrode as the common electrode provided below the piezoelectric body 70. The detection resistor 401 can be formed in a process of forming the common electrode, so that the cost can be reduced by simplifying the manufacturing process.

(E2) In each of the above embodiments, the material of the detection resistor 401 is platinum (Pt) and is formed of the same material as the first electrode 60. On the other hand, the detection resistor 401 may be formed of the same material as any of the common electrode and the drive wiring while being not limited to the individual electrode. For example, the detection resistor 401 may be formed of the same material as the second electrode 80 which is the common electrode. According to the liquid discharge head 510 of the aspect, for example, the detection resistor 401 can be formed in a process of forming the second electrode 80, so that the cost can be reduced by simplifying the manufacturing process. Further, the detection resistor 401 may be formed of the same material as the individual lead electrode 91 and the common lead electrode 92 which are drive wirings. According to the liquid discharge head 510 of the aspect, for example, the detection resistor 401 can be formed in a process of forming the individual lead electrode 91 and the common lead electrode 92, so that the cost can be reduced by simplifying the manufacturing process.

F. Other Aspects

The present disclosure is not limited to the above-described embodiments, and can be realized in various configurations without departing from the gist of the present disclosure. For example, technical features in the embodiments corresponding to technical features in respective aspects described in outline of the present disclosure can be appropriately replaced or combined in order to solve some or all of the above-described problems or achieve some or all of the above-described effects. Further, when the technical features are not described as essential in the present specification, the technical features can be appropriately deleted.

(1) According to one aspect of the present disclosure, there is provided a liquid discharge head. The liquid discharge head includes a pressure chamber substrate that is provided with a plurality of pressure chambers, a piezoelectric body that is driven to apply pressure to liquid in the pressure chambers, an upper electrode that is provided above the piezoelectric body for applying a voltage to the piezoelectric body, a lower electrode that is provided below the piezoelectric body for applying a voltage to the piezoelectric body, a detection resistor that is provided below the piezoelectric body for detecting temperature of the liquid in the pressure chambers, and a first wiring portion that is electrically coupled to the detection resistor. The first wiring portion includes a first part that is extended above the piezoelectric body, and a second part that is provided in at least a part of a through hole penetrating the piezoelectric body and electrically coupled to the detection resistor. According to the liquid discharge head of the aspect, by using the second part that electrically couples the detection resistor and the first wiring portion, the wiring length of the detection resistor can be shortened as compared with a structure in which the first wiring portion and the detection resistor are in contact and electrically coupled. Therefore, it is possible to suppress energy loss and signal attenuation in the detection resistor and improve the temperature detection accuracy.

(2) The liquid discharge head of the aspect may further include a second wiring portion that is electrically coupled to the lower electrode. The second wiring portion may be electrically coupled to the lower electrode pulled out from an end portion of the piezoelectric body to the outside. According to the liquid discharge head of the aspect, the contact space between the lower electrode and the piezoelectric body 70 is increased by pulling out the lower electrode from the end portion of the piezoelectric body to the outside, so that the space of the active portion of the piezoelectric element can be increased.

(3) In the liquid discharge head of the aspect, when viewed along a lamination direction of the piezoelectric body, the upper electrode, and the lower electrode, in a region in which the piezoelectric body and the first wiring portion overlap, a range in which the detection resistor is disposed may be narrower than a range in which the detection resistor is not disposed. According to the liquid discharge head of the aspect, the number of detection resistors in the vicinity of the coupling part between the first wiring portion and the detection resistor is reduced, so that it is possible to suppress energy loss and signal attenuation in the detection resistor and improve the temperature detection accuracy.

(4) The liquid discharge head of the aspect may further include a sealing substrate that has a wall portion and a ceiling portion, and protects an active portion of the piezoelectric body by the wall portion and the ceiling portion. When viewed along a lamination direction of the piezoelectric body, the upper electrode, and the lower electrode, the second part may be provided at a position overlapping the ceiling portion. By covering with the sealing substrate, the electrical coupling part between the first part and the detection resistor can be protected, and defects such as electrical opening and short circuit between the first part and the detection resistor can be suppressed.

(5) The liquid discharge head of the aspect may further include a protective layer that is formed of the same material as the upper electrode between the second part and the detection resistor. The second part may be electrically coupled to the detection resistor via at least a part of the protective layer. According to the liquid discharge head of the aspect, by laminating the protective layer on the detection resistor exposed from the through hole of the piezoelectric body, it is possible to reduce or prevent damage to the detection resistor during a manufacturing process due to etching or the like. As a result, it is possible to suppress the occurrence of film thickness variation of the detection resistor and suppress the decrease in the temperature detection accuracy.

(6) In the liquid discharge head of the aspect, when viewed along a lamination direction of the piezoelectric body, the upper electrode, and the lower electrode, the through hole is covered with the protective layer having a space larger than a space of the second part. According to the liquid discharge head of the aspect, by setting the protective layer to cover the detection resistor exposed from the through hole, it is possible to reduce or prevent damage to the detection resistor during a manufacturing process due to etching or the like.

(7) In the liquid discharge head of the aspect, the second part may be electrically coupled to the detection resistor via an opening portion provided in the protective layer. According to the liquid discharge head of the aspect, the second part can be brought into contact with the detection resistor via the opening portion while including the protective layer, the electric resistance between the detection resistor and the second part can be reduced, and the temperature detection accuracy can be improved.

(8) In the liquid discharge head of the aspect, the upper electrode may be commonly provided for the plurality of pressure chambers, and the lower electrode may be individually provided for the plurality of pressure chambers.

(9) In the liquid discharge head of the aspect, an electric resistance value per unit length of the detection resistor may be higher than an electric resistance value per unit length of the first wiring portion. According to the liquid discharge head of the aspect, the temperature detection accuracy can be improved by increasing the electric resistance value of the detection resistor, and the temperature detection accuracy can be increased by suppressing the energy loss and signal attenuation of the first wiring portion.

(10) In the liquid discharge head of the aspect, the second part may be provided by filling the through hole. According to the liquid discharge head of the aspect, as compared with the aspect in which the protective layer is included, the electric resistance between the detection resistor and the second part is reduced by increasing the space in which the second part is in contact with the detection resistor, so that the temperature detection accuracy can be improved.

(11) In the liquid discharge head of the aspect, when a direction in which the plurality of pressure chambers are arranged is set as an arrangement direction and a direction orthogonal to both of the arrangement direction and the lamination direction is set as an intersection direction, the detection resistor may include a first extending part that is electrically coupled to the first wiring portion and extends along the intersection direction outside the plurality of pressure chambers, and a second extending part that is continuous from the first extending part and extends along the arrangement direction. According to the liquid discharge head of the aspect, by disposing the second extending part along the arrangement direction of the plurality of pressure chambers, it is possible to efficiently dispose the detection resistor from a viewpoint of temperature detection of the plurality of pressure chambers.

(12) In the liquid discharge head of the aspect, when a shortest distance from the first extending part to the plurality of pressure chambers is set as a first distance and a shortest distance from the second extending part to the plurality of pressure chambers is set as a second distance, the first distance may be longer than the second distance. According to the liquid discharge head of the aspect, by disposing the second extending part in the vicinity of the plurality of pressure chambers, it is possible to more efficiently dispose the detection resistor from a viewpoint of temperature detection of the plurality of pressure chambers.

(13) According to another aspect of the present disclosure, there is provided a liquid discharge device. The liquid discharge device includes the liquid discharge head of the aspect, and a control section that controls a discharge operation of the liquid discharge head.

The present disclosure can also be realized in various aspects other than the liquid discharge device and the liquid discharge head. For example, it is possible to realize the present disclosure with an aspect of a method for manufacturing a liquid discharge head, a method for manufacturing a liquid discharge device, or the like.

The present disclosure is not limited to the ink jet method, and can be applied to any liquid discharge device that discharges a liquid other than the ink and a liquid discharge head that is used for the liquid discharge device. For example, the present disclosure can be applied to the following various liquid discharge devices and liquid discharge heads thereof.

(1) An image recording device such as a facsimile device.
(2) A color material discharge device used for manufacturing a color filter for an image display device such as a liquid crystal display.
(3) An electrode material discharge device used for forming electrodes of an organic Electro Luminescence (EL) display, a Field Emission Display (FED), or the like.
(4) A liquid discharge device that discharges a liquid containing a bioorganic substance used for manufacturing a biochip.
(5) A sample discharge device as a precision pipette.
(6) A lubricating oil discharge device.
(7) A resin liquid discharge device.
(8) A liquid discharge device that discharges lubricating oil with pinpoint to a precision machine such as a watch or a camera.
(9) A liquid discharge device that discharges a transparent resin liquid, such as an ultraviolet curable resin liquid, onto a substrate in order to form a micro hemispherical lens (optical lens) or the like used for an optical communication element or the like.
(10) A liquid discharge device that discharges an acidic or alkaline etching liquid for etching a substrate or the like.
(11) A liquid discharge device including a liquid consumption head that discharges any other minute amount of droplets.

Further, the "liquid" may be any material that can be consumed by the liquid discharge device. For example, the "liquid" may be a material in a state when a substance is liquefied, and the "liquid" includes a liquid state material with high or low viscosity and a liquid state material, such as a sol, gel water, other inorganic solvent, organic solvent, solution, liquid resin, and liquid metal (metal melt). Further, the "liquid" includes not only a liquid as a state of a substance but also a liquid in which particles of a functional material made of a solid substance, such as a pigment or a metal particle, are dissolved, dispersed, or mixed in a solvent. Further, the following is mentioned as a typical example of a liquid.

(1) Adhesive main agent and curing agent.

(2) Paint-based paints and diluents, clear paints and diluents.

(3) Main solvent and diluting solvent containing cells of ink for cells.

(4) Metallic leaf pigment dispersion liquid and diluting solvent of ink (metallic ink) that develops metallic luster.

(5) Gasoline/diesel and biofuel for vehicle fuel.

(6) Main ingredients and protective ingredients of medicine.

(7) Light Emitting Diode (LED) fluorescent material and encapsulant.

What is claimed is:

1. A liquid discharge head comprising:

a pressure chamber substrate that is provided with a plurality of pressure chambers;

a piezoelectric body that is driven to apply pressure to liquid in the pressure chambers;

an upper electrode that is provided above the piezoelectric body for applying a voltage to the piezoelectric body;

a lower electrode that is provided below the piezoelectric body for applying a voltage to the piezoelectric body;

a detection resistor that is provided below the piezoelectric body for detecting temperature of the liquid in the pressure chambers; and a first wiring portion that is electrically coupled to the detection resistor, wherein the first wiring portion includes a first part that is extended above the piezoelectric body, and a second part that is provided in at least a part of a through hole penetrating the piezoelectric body and electrically coupled to the detection resistor.

2. The liquid discharge head according to claim 1, further comprising:

a second wiring portion that is electrically coupled to the lower electrode, wherein the second wiring portion is electrically coupled to the lower electrode pulled out from an end portion of the piezoelectric body to the outside.

3. The liquid discharge head according to claim 1, wherein when viewed along a lamination direction of the piezoelectric body, the upper electrode, and the lower electrode, in a region in which the piezoelectric body and the first wiring portion overlap, a range in which the detection resistor is disposed is narrower than a range in which the detection resistor is not disposed.

4. The liquid discharge head according to claim 1, further comprising:

a sealing substrate that has a wall portion and a ceiling portion, and protects an active portion of the piezoelectric body by the wall portion and the ceiling portion, wherein when viewed along a lamination direction of the piezoelectric body, the upper electrode, and the lower electrode, the second part is provided at a position overlapping the ceiling portion.

5. The liquid discharge head according to claim 1, further comprising:

a protective layer that is formed of the same material as the upper electrode between the second part and the detection resistor, wherein the second part is electrically coupled to the detection resistor via at least a part of the protective layer.

6. The liquid discharge head according to claim 5, wherein when viewed along a lamination direction of the piezoelectric body, the upper electrode, and the lower electrode, the through hole is covered with the protective layer having a space larger than a space of the second part.

7. The liquid discharge head according to claim 5, wherein the second part is electrically coupled to the detection resistor via an opening portion provided in the protective layer.

8. The liquid discharge head according to claim 1, wherein the upper electrode is commonly provided for the plurality of pressure chambers, and the lower electrode is individually provided for the plurality of pressure chambers.

9. The liquid discharge head according to claim 1, wherein an electric resistance value per unit length of the detection resistor is higher than an electric resistance value per unit length of the first wiring portion.

10. The liquid discharge head according to claim 1, wherein the second part is provided by filling the through hole.

11. The liquid discharge head according to claim 1, wherein when a direction in which the plurality of pressure chambers are arranged is set as an arrangement direction and a direction orthogonal to both of the arrangement direction and the lamination direction is set as an intersection direction, the detection resistor includes a first extending part that is electrically coupled to the first wiring portion and extends along the intersection direction outside the plurality of pressure chambers, and a second extending part that is continuous from the first extending part and extends along the arrangement direction.

12. The liquid discharge head according to claim 11, wherein when a shortest distance from the first extending part to the plurality of pressure chambers is set as a first distance and a shortest distance from the second extending part to the plurality of pressure chambers is set as a second distance, the first distance is longer than the second distance.

13. A liquid discharge device comprising:

the liquid discharge head according to claim 1; and a control section that controls a discharge operation of the liquid discharge head.

* * * * *